L. BIAVA.
TRANSMISSION GEAR FOR MOTOR VEHICLES.
APPLICATION FILED FEB. 7, 1918.
1,287,194.                                      Patented Dec. 10, 1918.
                                                      14 SHEETS—SHEET 4.
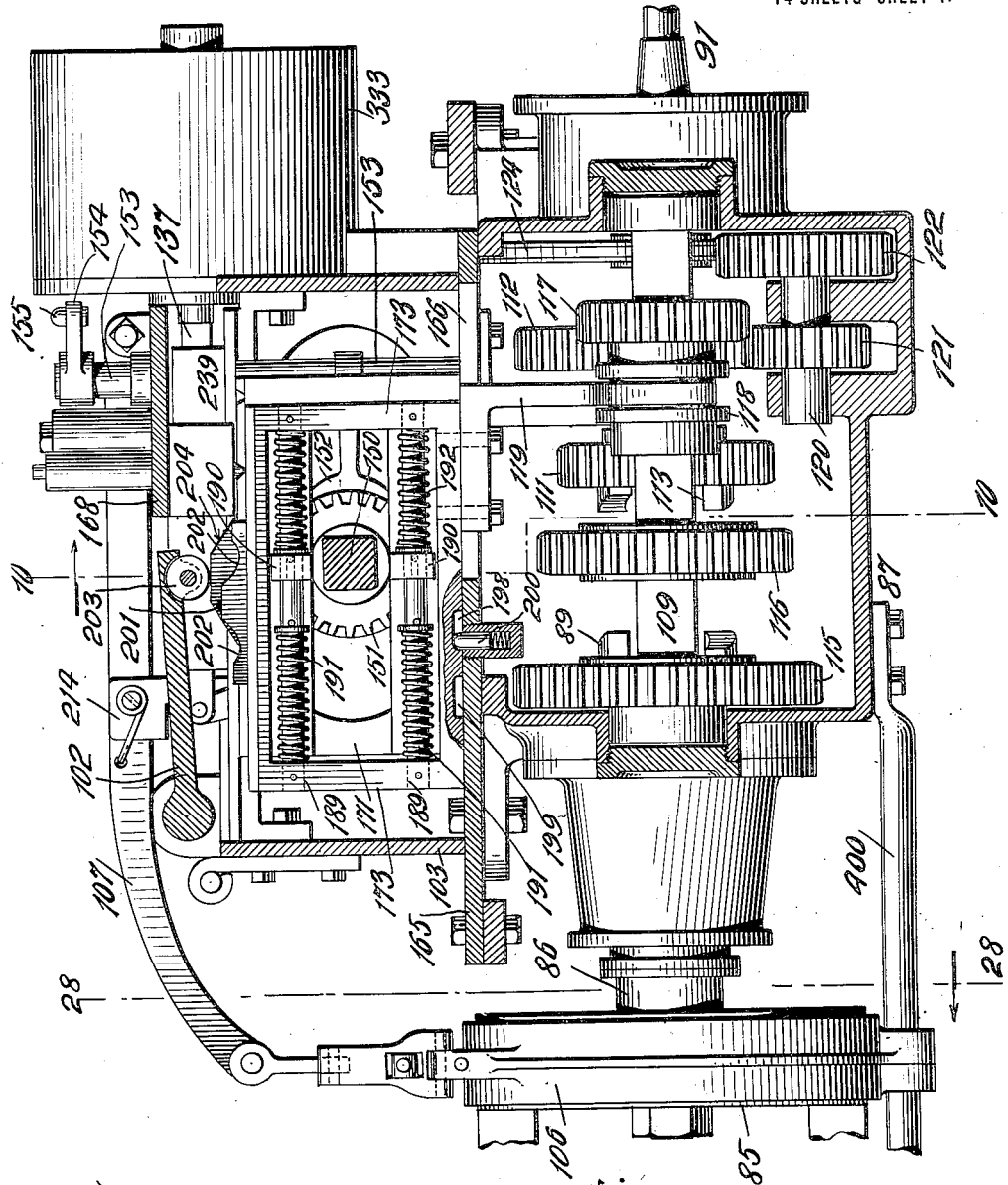
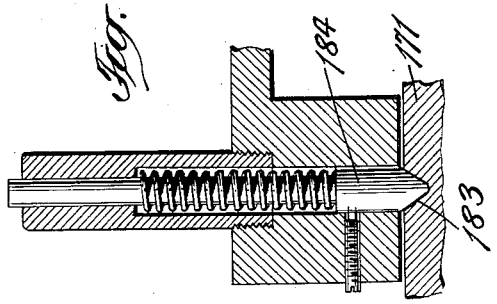
Inventor
LOUIS BIAVA
By his Attorney

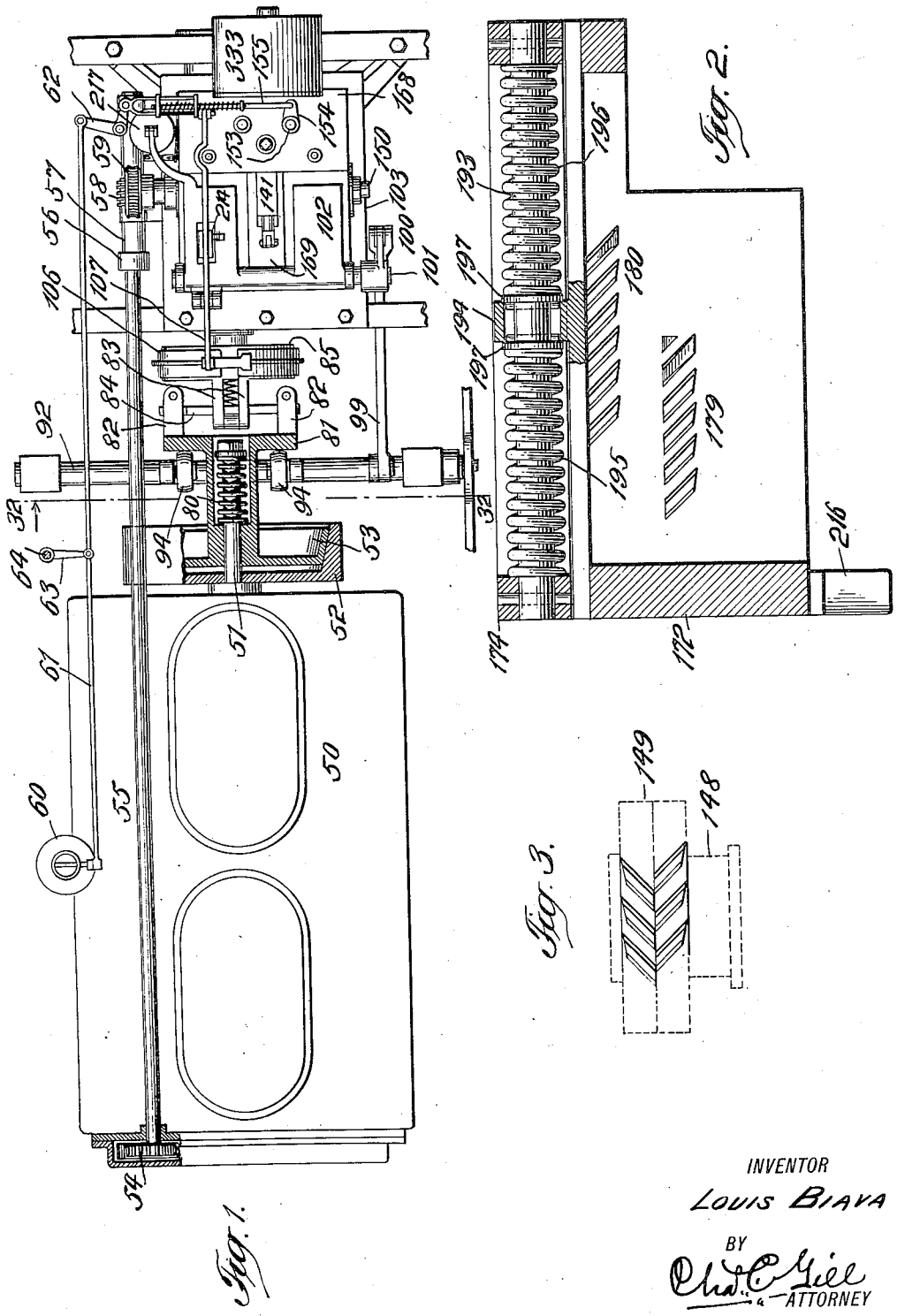

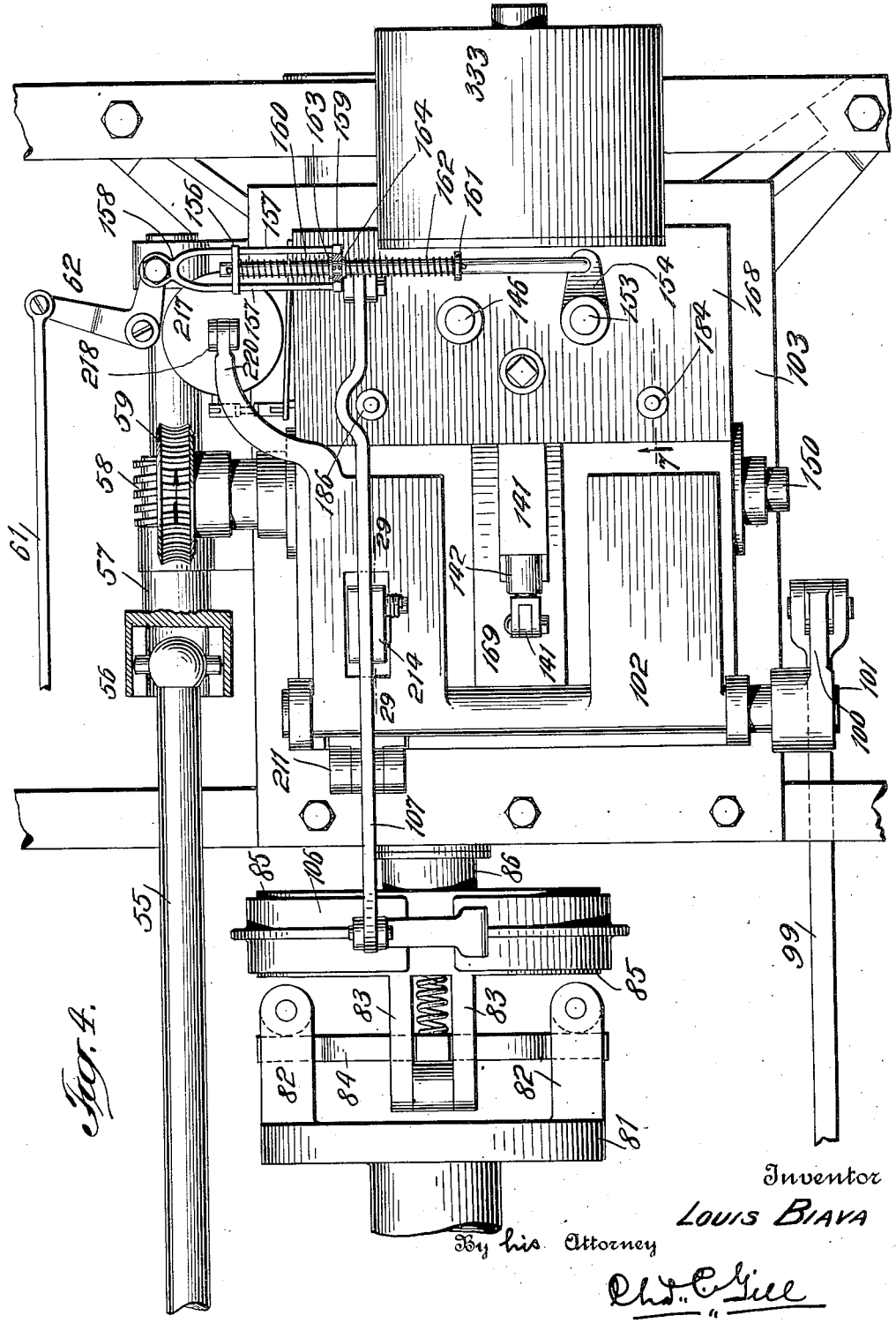

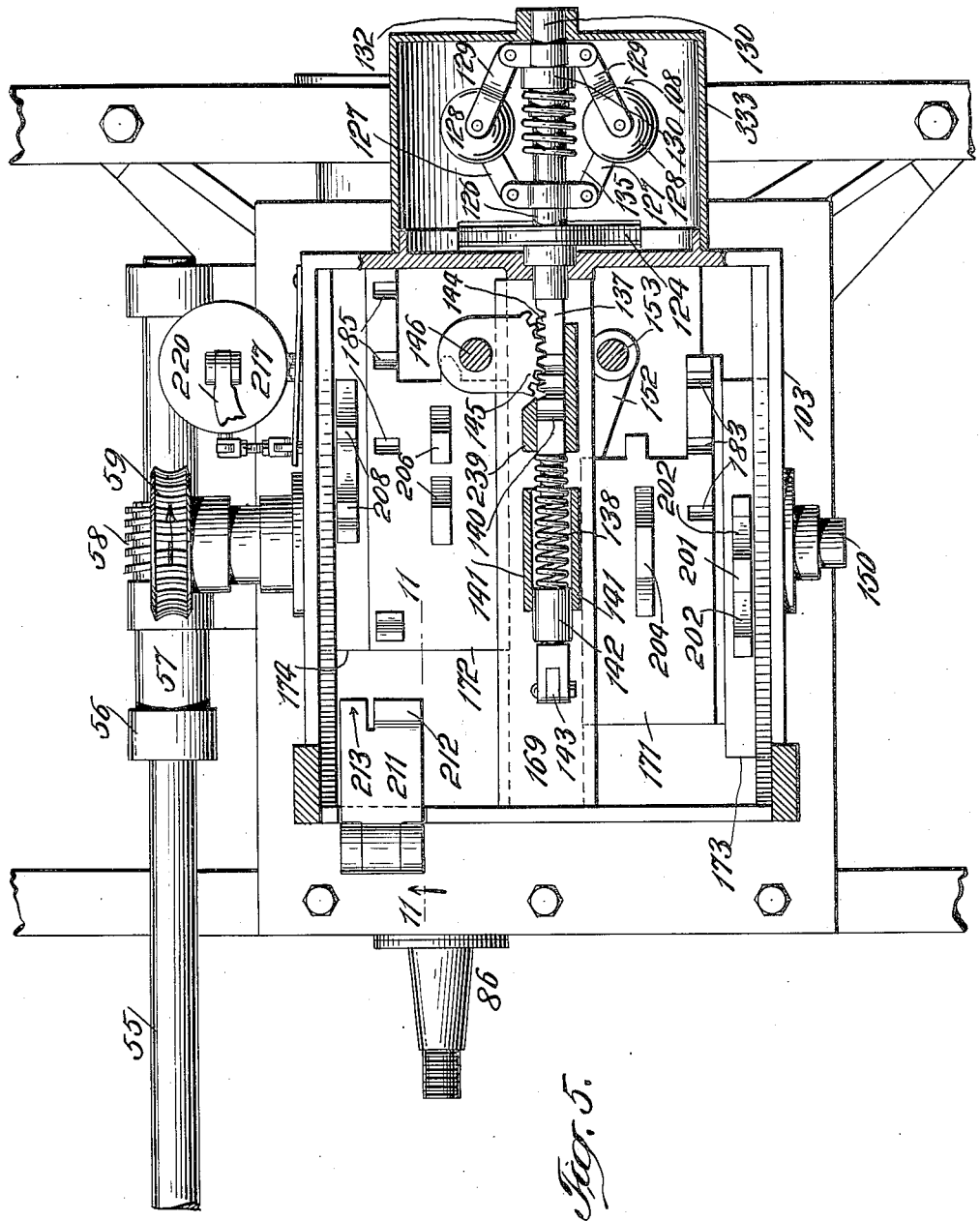

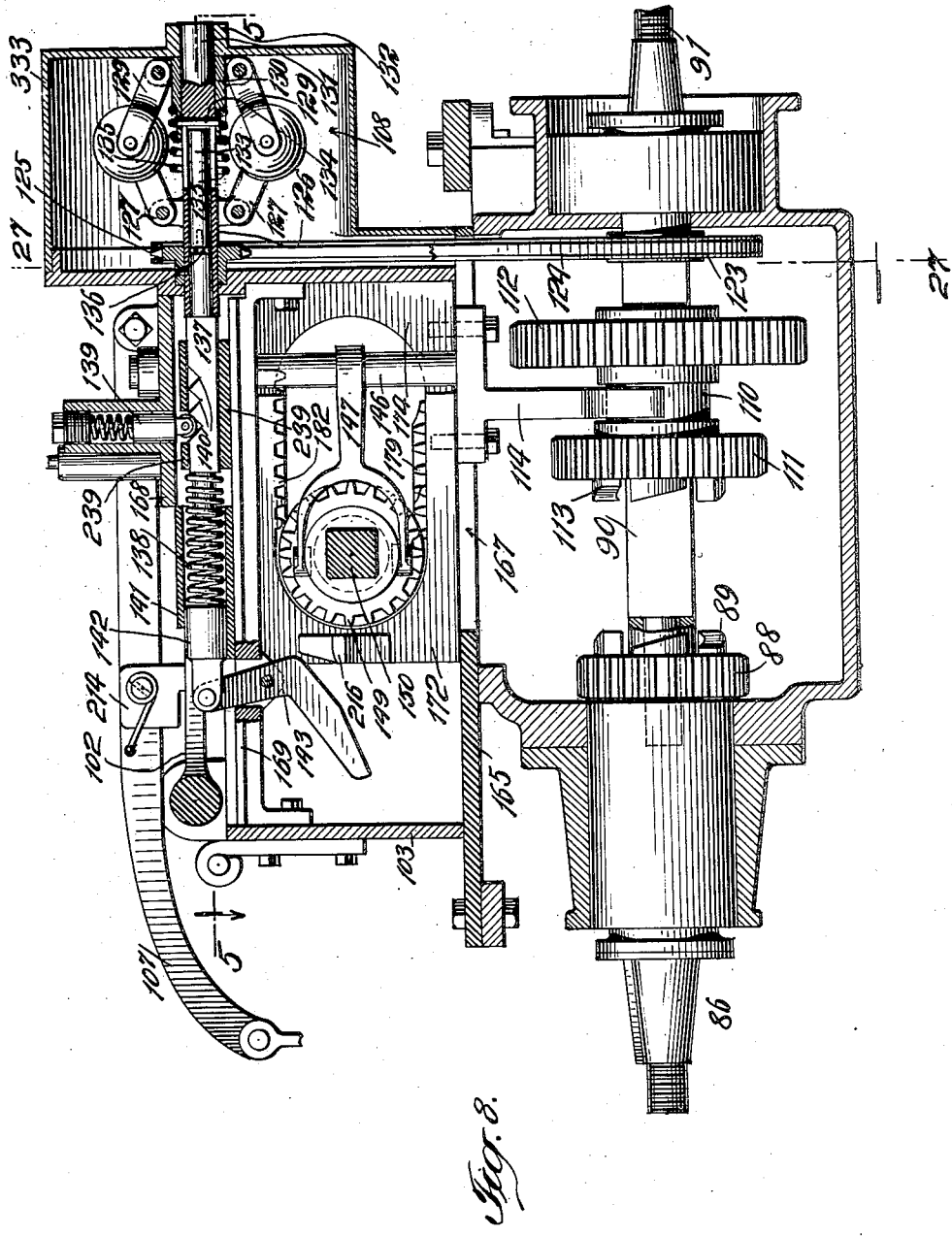

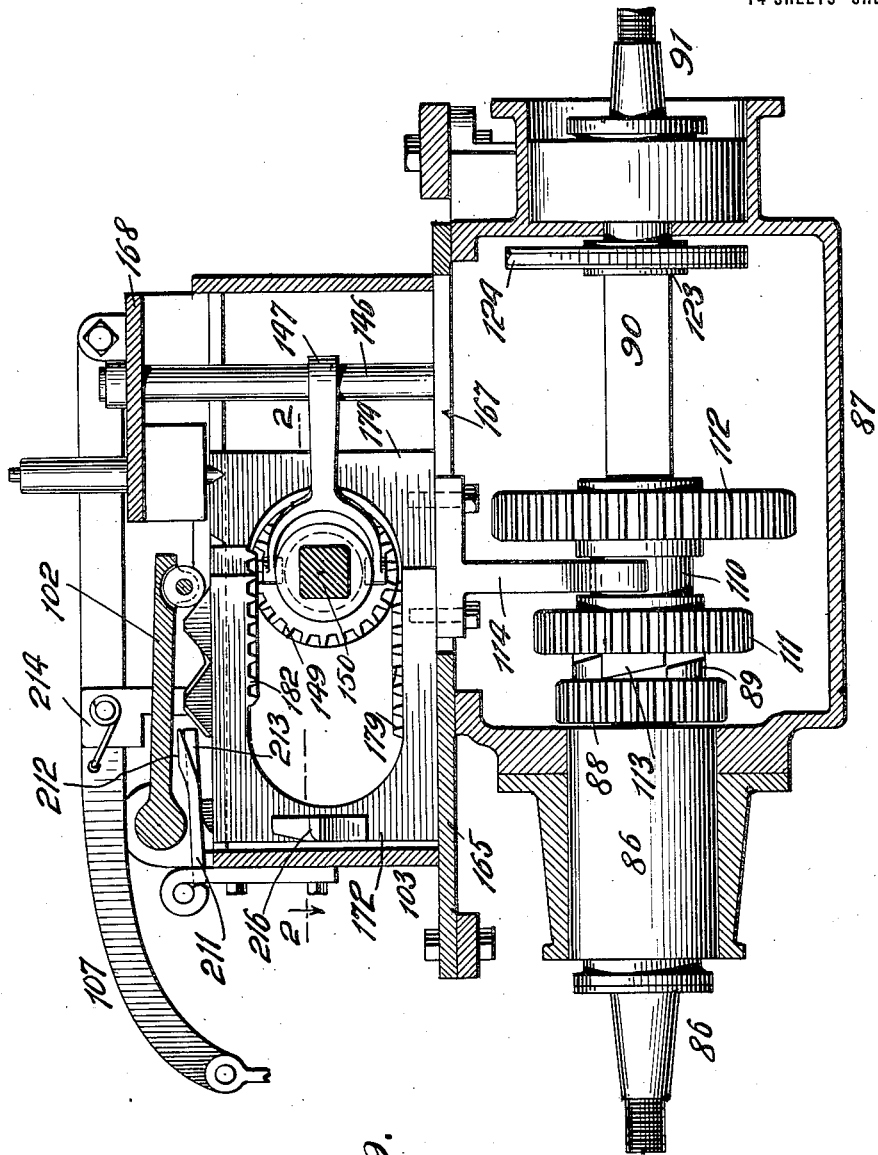

L. BIAVA.
TRANSMISSION GEAR FOR MOTOR VEHICLES.
APPLICATION FILED FEB. 7, 1918.

1,287,194.

Patented Dec. 10, 1918.
14 SHEETS—SHEET 7.

Inventor
LOUIS BIAVA
By his Attorney
Chas. E. Gill

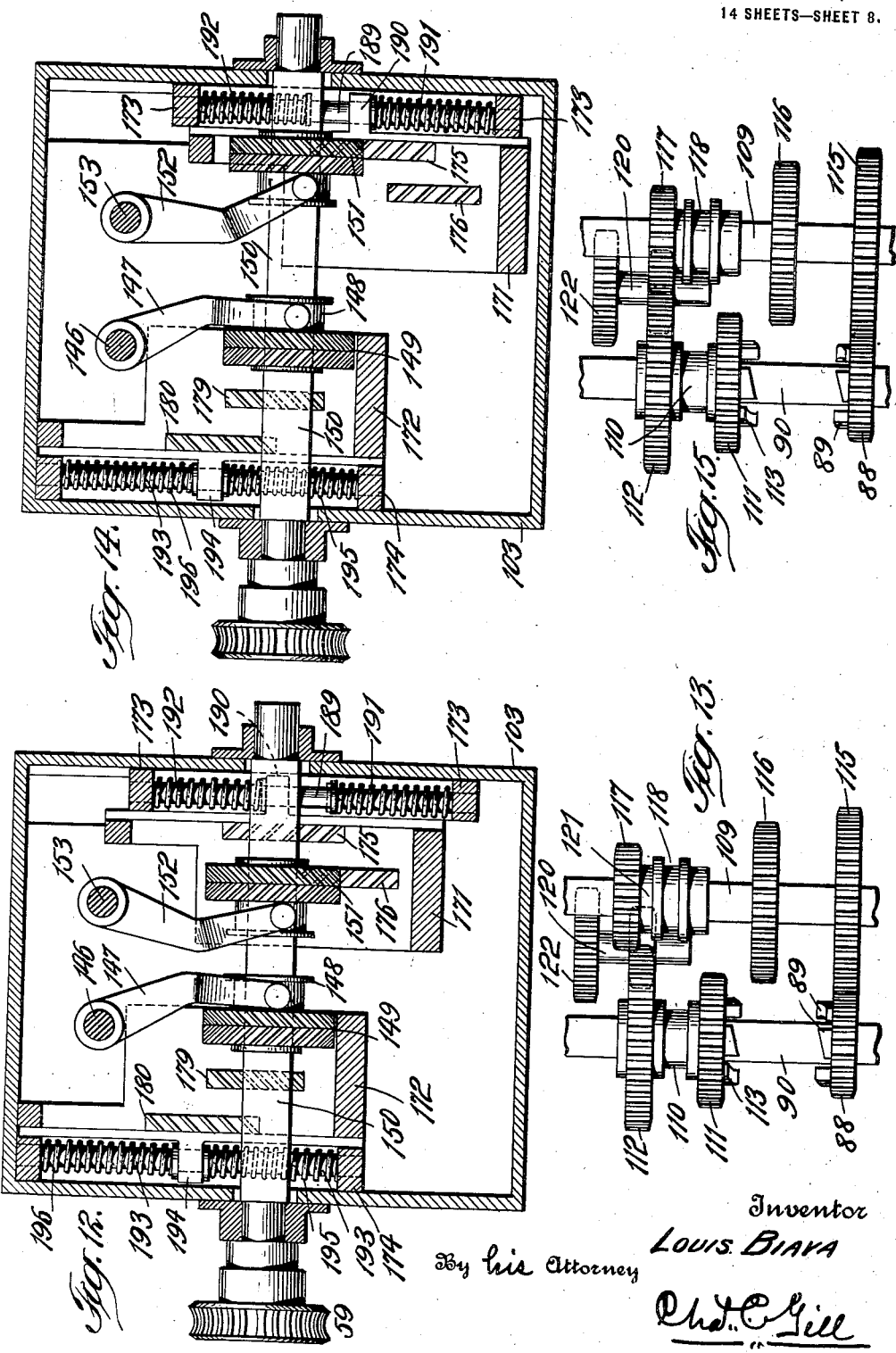

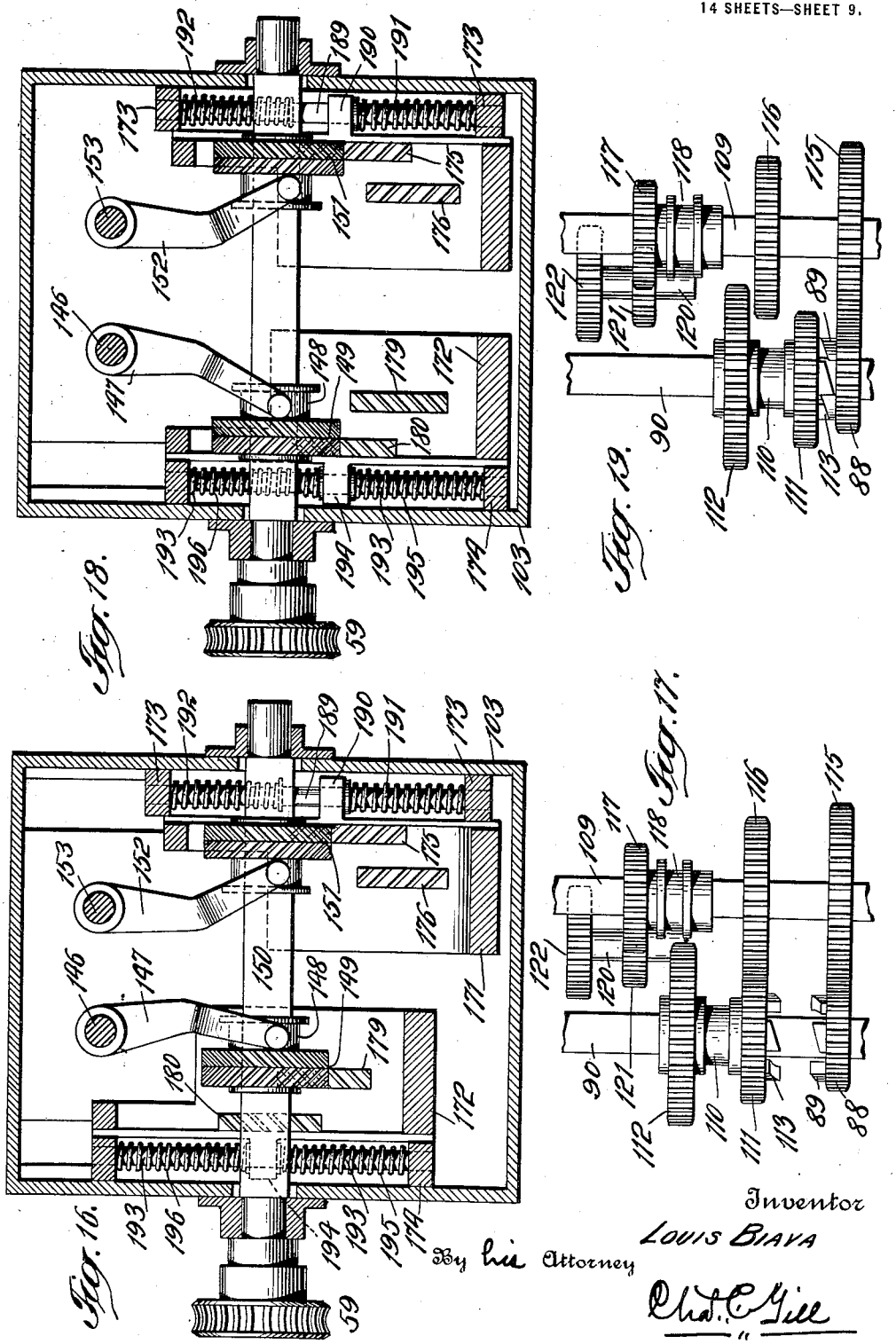

L. BIAVA.
TRANSMISSION GEAR FOR MOTOR VEHICLES.
APPLICATION FILED FEB. 7, 1918.
1,287,194.
Patented Dec. 10, 1918.
14 SHEETS—SHEET 10.
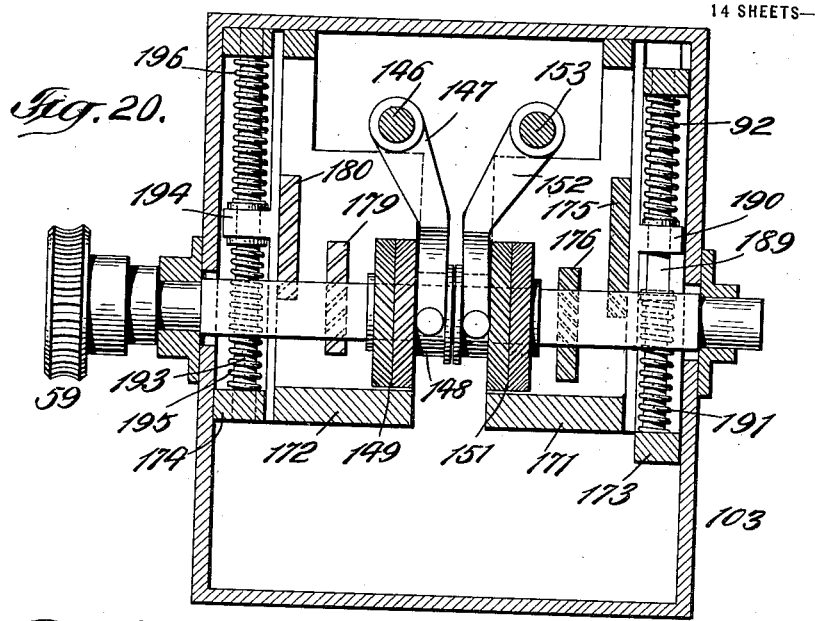
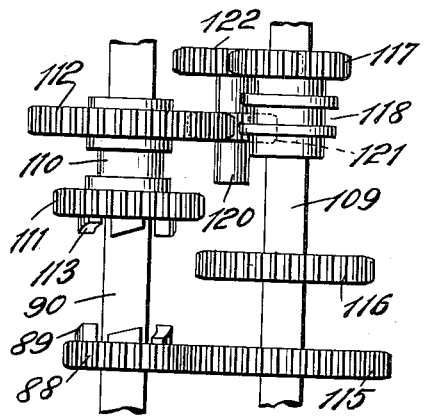
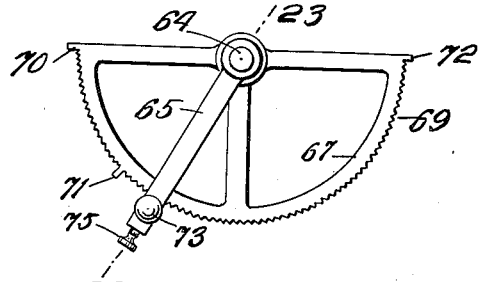
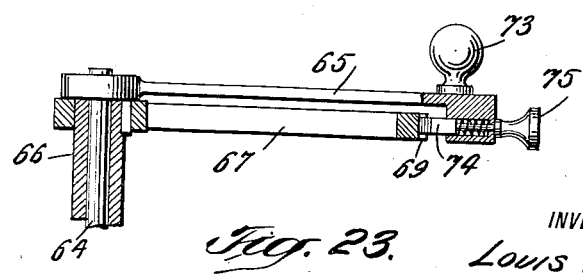
INVENTOR
LOUIS BIAVA
BY Chas. C. Gill
ATTORNEY

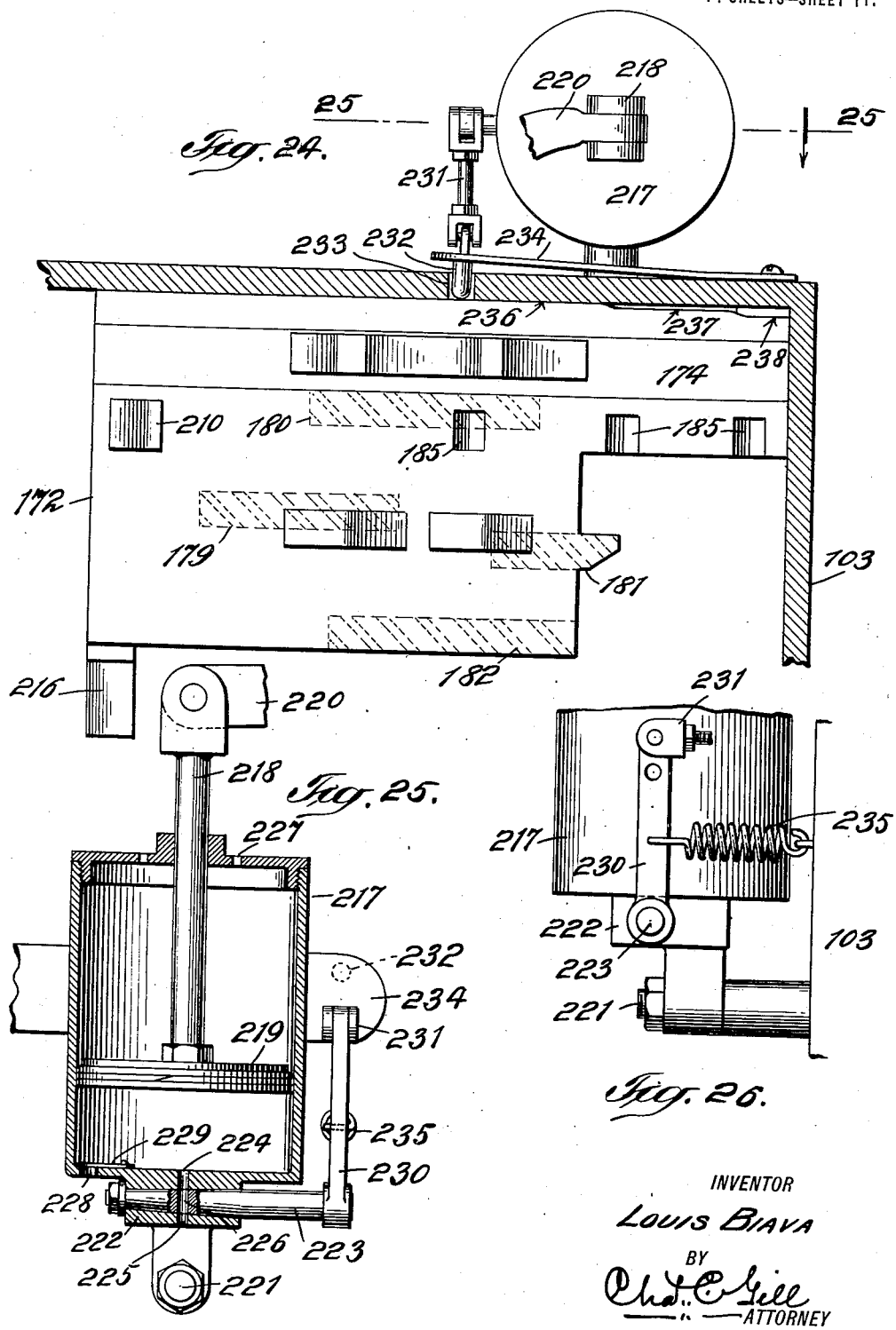

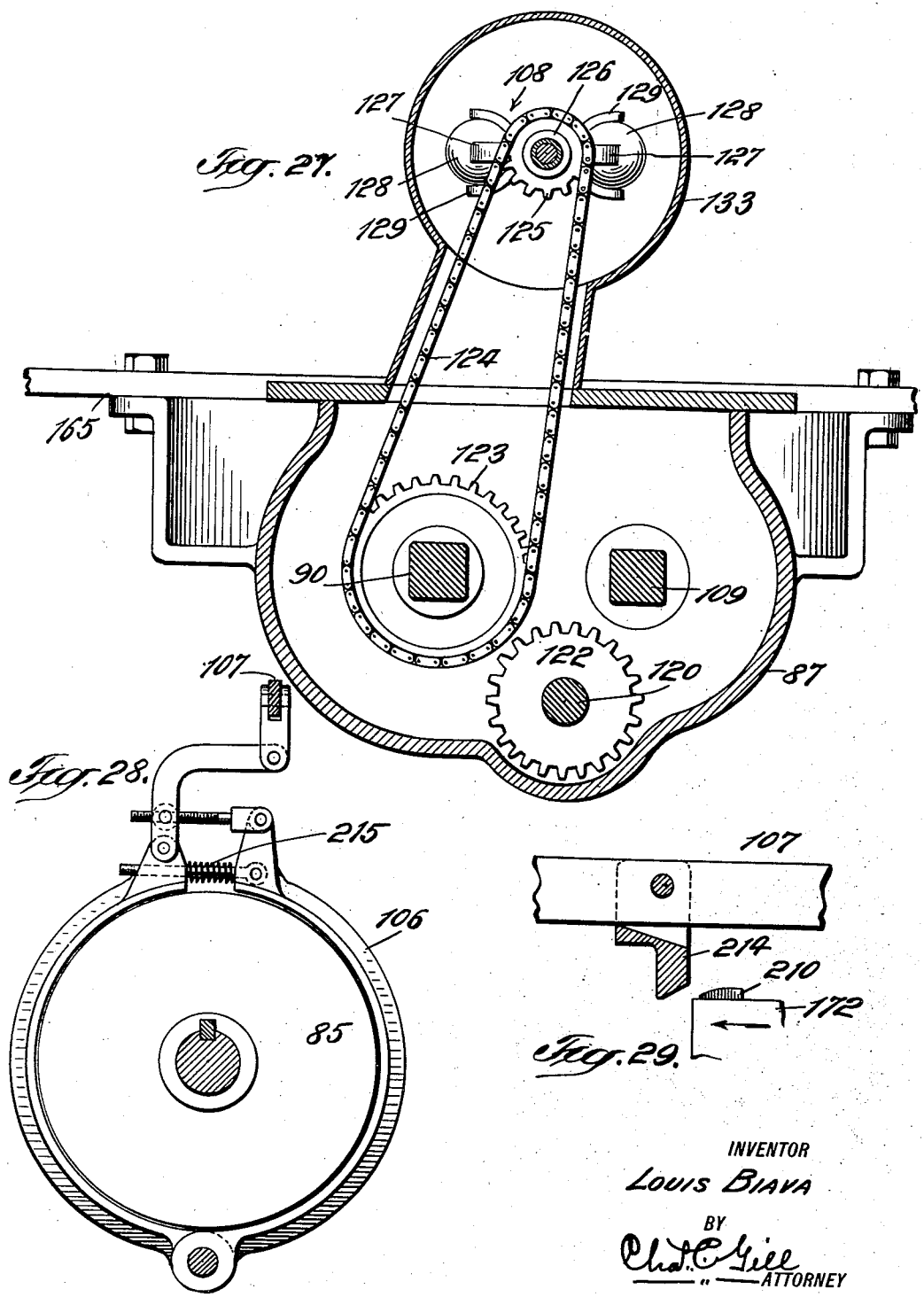

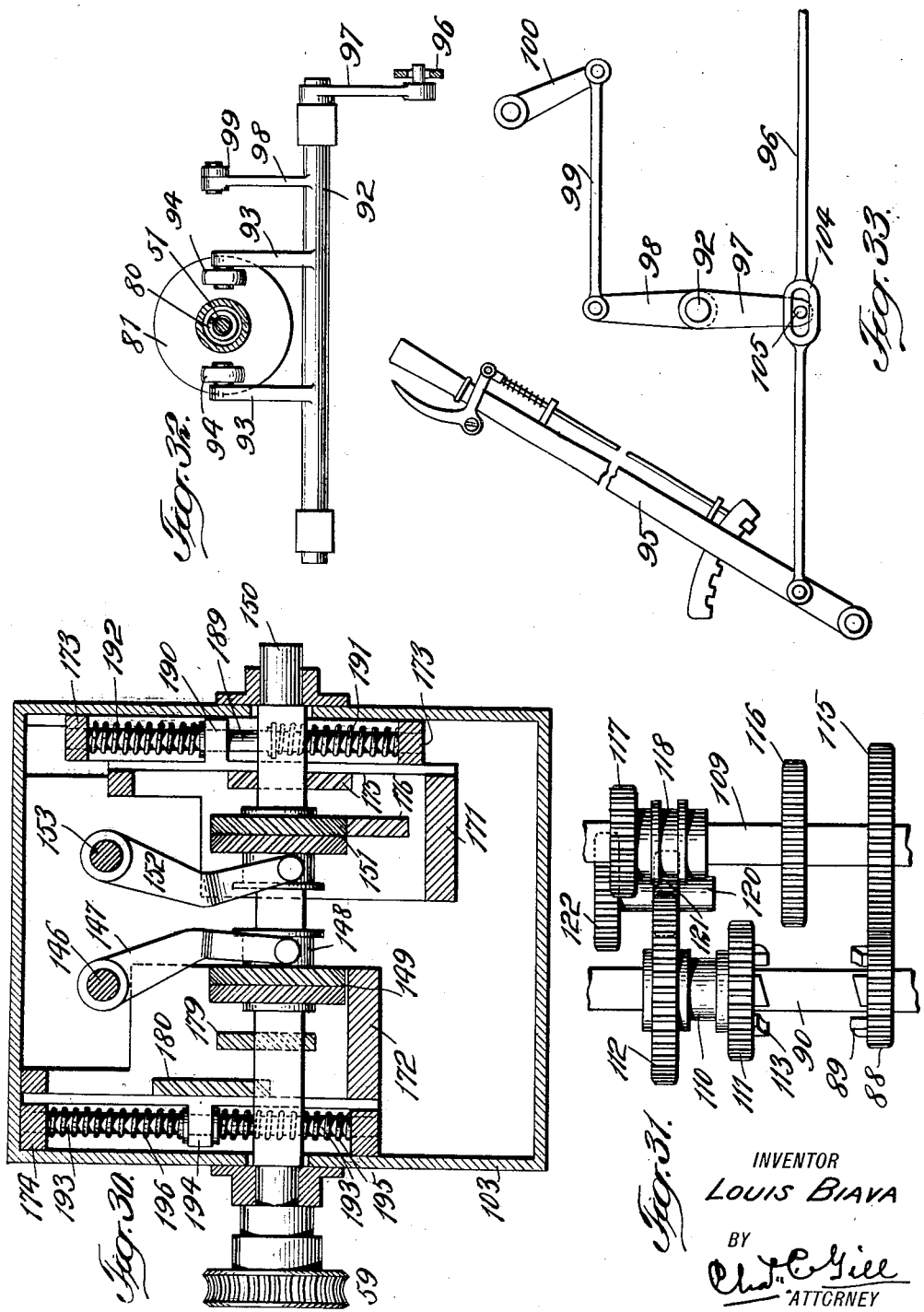

L. BIAVA.
TRANSMISSION GEAR FOR MOTOR VEHICLES.
APPLICATION FILED FEB. 7, 1918.

1,287,194.

Patented Dec. 10, 1918.
14 SHEETS—SHEET 14.

INVENTOR
LOUIS BIAVA
BY
ATTORNEY

UNITED STATES PATENT OFFICE.

LOUIS BIAVA, OF WEST HOBOKEN, NEW JERSEY.

TRANSMISSION-GEAR FOR MOTOR-VEHICLES.

1,287,194.

Specification of Letters Patent.

Patented Dec. 10, 1918.

Application filed February 7, 1918. Serial No. 215,758.

*To all whom it may concern:*

Be it known that I, LOUIS BIAVA, a citizen of the United States, and a resident of West Hoboken, in the county of Hudson and State of New Jersey, have invented certain new and useful Improvements in Transmission-Gear for Motor-Vehicles, of which the following is a specification.

The invention pertains more particularly to transmission gearing intended, among other purposes, for use on automobiles or other motor vehicles.

One object of the invention is to provide automatic mechanism, under the control of the operator, for shifting the gearing, more especially into position for second speed and third speed and back to second speed and to first speed, as may be required, said automatic mechanism comprising, among other features, a governor which will act to effect the shifting of the gearing in accordance with and due to the speed of the vehicle. In addition to the automatic mechanism referred to, my invention comprises means by which I may manually control the feed of the fuel or gasolene from the carbureter or other source of supply to the engine, and also control the movement of the transmission gears from a neutral position to that termed first speed and back to the neutral position and from such position, when necessary, to position for reversing the vehicle. The varying speeds of the vehicle from that attained under the direct action of the operator, is accomplished automatically by the speed of the vehicle, and such speeds are, however, always under the control of the operator who at all times may govern the quantity of fuel fed to the engine and in that way modify the speed of the vehicle.

The mechanism of my invention comprises a gear box in which the gears for securing varying speeds from first speed to high speed, as well as a reversal in the direction of motion of the vehicle, are confined, an auxiliary casing mounted upon the gear box and containing certain racks and gears and other features of mechanism by which the shifting of the gears in the gear-box may be accomplished, means for shifting the gears and mechanism in said casing, both manually and automatically, the automatic shifting being governed by the speed of the vehicle, and other features, all of which will be specifically referred to hereinafter.

The invention will be fully understood from the detailed description hereinafter presented, reference being had to the accompaying drawings, in which:

Figure 1 is a top view, partly broken away and partly in section, of an engine and transmission gear apparatus constructed in accordance with and embodying my invention, the engine being represented diagrammatically;

Fig. 2 is a horizontal section, on a larger scale, through certain sliding frames embodied in the automatic features of the gear shifting mechanism, the section being on the dotted line 2—2 of Fig. 9;

Fig. 3 is a diagrammatic view illustrating a gear-wheel which is used in connection with the racks on one of the frames shown in Fig. 2, Fig. 3 being presented to illustrate the beveled ends of the teeth on said gear-wheel, and the beveled ends of the teeth of said racks being shown in Fig. 2;

Fig. 4 is a top view, partly broken away and partly in section, of the mechanism constituting my invention, Fig. 4 illustrating such mechanism on a larger scale than was possible in Fig. 1;

Fig. 5 is a horizontal section, on the same scale as Fig. 4, through a portion of the mechanism of my invention, the section being on the dotted line 5—5 of Fig. 8;

Fig. 6 is a vertical longitudinal section through the mechanism of my invention, taken on the dotted line 6—6 of Fig. 10;

Fig. 7 is an enlarged sectional view of a detail taken on the dotted line 7—7 of Fig. 4;

Fig. 8 is a vertical longitudinal section through the mechanism of my invention, taken on the dotted line 8—8 of Fig. 10;

Fig. 9 is a section corresponding substantially with Fig. 8 but illustrating the automatic features as having moved and as having shifted the gearing from the position shown in Fig. 8 to high speed position;

Fig. 12 is a horizontal section through the gear-shifting mechanism, taken on the dotted line 12—12 of Fig. 10, the parts of the mechanism being shown in the relation they have when the transmission gear has been moved to or is in neutral position;

Fig. 13 is a detached top view of the transmission gears and their shafts, the latter being partly broken away, and illustrates the position of said gears with relation to each other when they have been moved to neutral, the positions shown in Figs. 12 and 13 being harmonious and both indicating the neutral position of the gears;

Fig. 14 is a horizontal section corresponding with Fig. 12 but illustrating the relation of the parts when moved to shift the gearing to first speed;

Fig. 15 is a view of the transmission gears and their shafts, the latter being partly broken away, when the gearing is set for first speed;

Fig. 16 is a section corresponding with Figs. 12 and 14 but illustrating the relation of the parts of the mechanism when such parts have been moved to set the transmission gears on second speed position;

Fig. 17 is a detached top view showing the transmission gears positioned for second speed;

Fig. 18 is a horizontal section corresponding with Figs. 12, 14, 16 but illustrating the position of the parts when the same have been moved to shift the transmission gears to third or high speed position;

Fig. 19 is a top view of the transmission gears and portions of their shafts when said gears are positioned on third or high speed;

Fig. 20 is a horizontal section corresponding with Figs. 12, 14, 16 and 18, but illustrating the relation of the parts when the same have been moved to shift the gears to reverse position;

Fig. 21 is a detached top view of the transmission gears, with portions of their shafts, showing said gears positioned for reverse;

Figure 34:
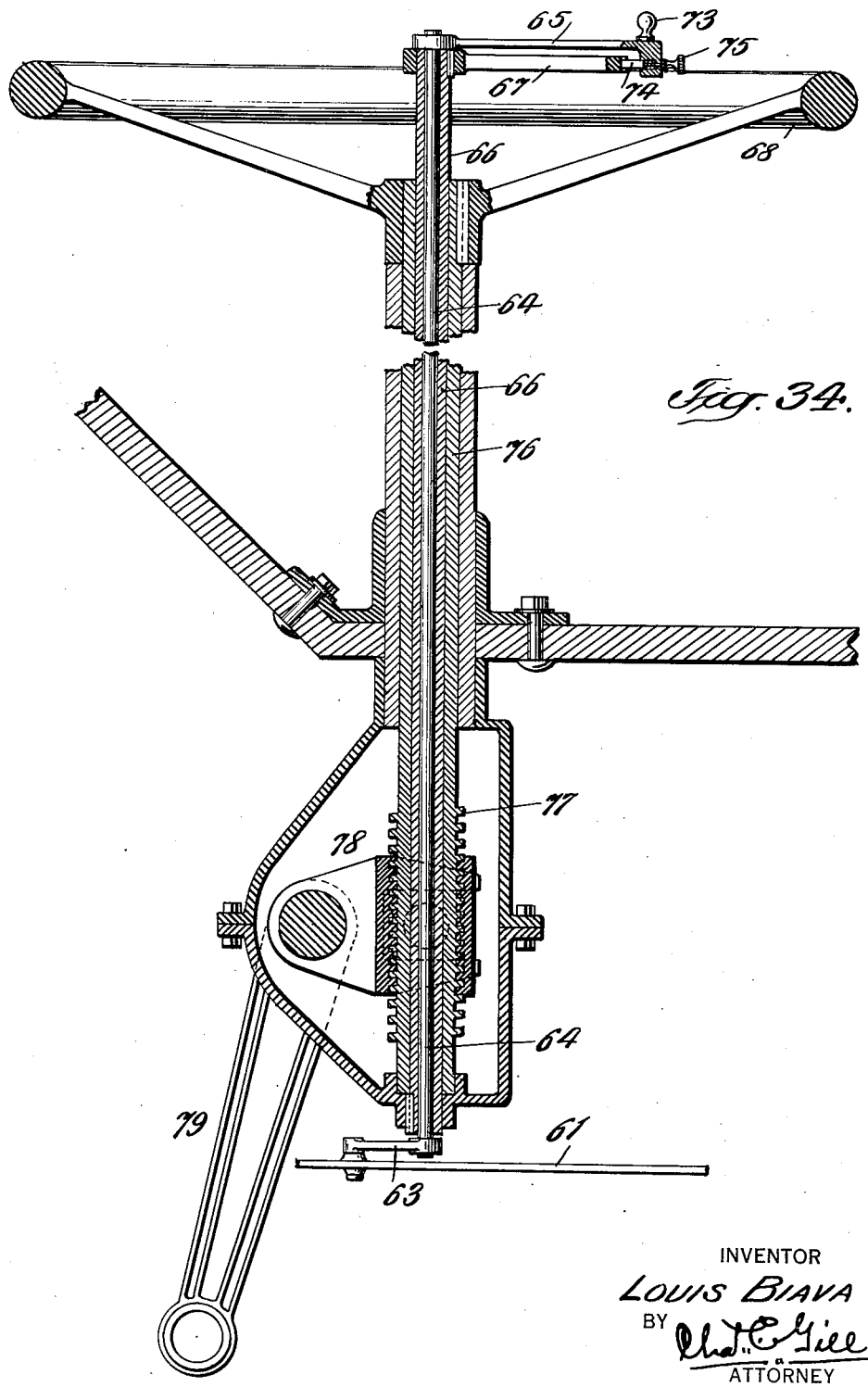

Fig. 22 is a detached top view of a sector and sector-lever, the latter being operable manually for controlling the feed of fuel to the engine and also for moving certain mechanism for primarily setting the transmission gears from neutral to first, from first to neutral, from neutral to reverse and back from reverse to neutral, the shifting of the transmission gears from first to second or second to third or high speed being accomplished automatically by the means hereinafter described, under the control, however, of the operator moving the sector lever to feed the requisite quantity of gas to the engine;

Fig. 23 is a vertical section through the same, taken on the dotted line 23—23 of Fig. 22;

Fig. 24 is a horizontal longitudinal section through the upper auxiliary box or casing and illustrates in top view, two of the sliding frames located within the right hand portion of said box or casing and also certain air cushioning mechanism referred to hereinafter in detail;

Fig. 25 is a sectional view through the air-cushioning or check mechanism, taken on the dotted line 25—25 of Fig. 24;

Fig. 26 is a side elevation, partly broken away, of the same, taken from the lower right hand side of Fig. 25;

Fig. 27 is a vertical section through the gear-box and associated mechanism, taken on the dotted line 27—27 of Fig. 8;

Fig. 28 is a vertical section, taken on the dotted line 28—28 of Fig. 6 and illustrates more particularly a brake mechanism;

Fig. 29 is a detail, showing certain features hereinafter referred to, associated with the brake mechanism of Fig. 28, Fig. 29 being partly broken away and partly in section and taken about on the dotted line 29—29 of Fig. 4;

Fig. 30 is a sectional view corresponding with Figs. 12, 14, 16 and 18 and illustrates the position of the parts for shifting the transmission gears in the relation they occupy when they have been moved to set the transmission gears from reverse to neutral;

Fig. 31 illustrates the position of the transmission gears in the relation of the mechanism shown in Fig. 30;

Fig. 32 is a vertical transverse section through a portion of the mechanism, taken on the dotted line 32—32 of Fig. 1;

Fig. 33 is a diagrammatic view illustrating the connections for the usual emergency brake with the engine clutch and other mechanisms, and Fig. 34 is a vertical section through the steering post and its connections and illustrates the sector shown in Fig. 22, and the operative connections of the sector lever, in position with relation to said steering post, it being convenient to have the steering wheel and the said sector and its lever in convenient relation to one another.

In the drawings, 50 indicates, diagrammatically, an engine, which may be of any suitable type, 51 a portion of the engine shaft, 52 a fly-wheel and clutch member connected therewith, 53 a coöperating clutch member slidable on said shaft, 54 the usual timing gear at the front of the engine, and 55 a shaft connected therewith and coupled by a loose joint 56 with a shaft 57 on which is a worm 58, the latter being in mesh with a worm wheel 59. The carbureter is diagrammatically indicated at 60, and the feed of fuel from the carbureter to the engine is manually controlled through a rod 61, in accordance with the speed it is desired the vehicle shall have. The rod 61 is used primarily to set the transmission gear from neutral to first speed, from first speed back to neutral, from neutral to reverse and from reverse back to neutral, as well as to control the feed of fuel from the carbureter to the engine. The rod 61 is a shifting rod and at one end is connected with the carbureter valve and at the other end is pivotally connected with a bell-crank lever 62, whose outline is shown more particularly in Figs. 4 and 10, and which bell-crank lever 62 is connected with means for the primary shifting of the transmission gears, as will be hereinafter explained. The shifting of the rod 61 is accomplished by the mechanism illustrated more particularly in Figs. 22, 23 and 34. As may be seen on reference to Figs. 1 and 34, the rod 61 is pivotally connected with a crank-arm 63 which is rigidly secured on the lower end of a vertical rod or shaft 64 which extends upwardly through what may be termed the steering post and has secured upon its upper end the sector lever 65, clearly shown in Figs. 22, 23, 34. The rod 64 is confined within a stationary sleeve 66, and upon the upper end of this sleeve is rigidly secured the sector 67, this sector being within the outline of the steering wheel 68 and preferably describing a half circle and having a toothed arcuate edge 69 and suitable stops 70, 71 and 72, respectively. The lever 65 may be swung along over the sector 67 and when so moved turns the rod 64 and causes the latter through the crank 63 on its lower end to shift the rod 61 in accordance with the direction of movement of the lever 65 and to an extent governed by the extent to which said lever 65 may be moved. The lever 65 is provided with a knob or handle 73 for convenience in moving it, and also with a spring dog 74 to yieldingly engage the teeth 69 on the sector 67 for retaining the lever 65 in any position to which it may be moved by the operator. The spring dog 74 has a knob or handle 75 by which the dog may be pulled outwardly when it is desired to carry the same over the projection 71 on the sector 67, this taking place when it is desired to primarily move the transmission gear from neutral to reverse position. When the sector lever 65 is adjacent to the stop 71, the transmission gears will be in a neutral position, and when it is desired to shift said gears from such position to reverse position, the dog 74 will be pulled outwardly so as to pass the stop 71 and the lever 65 will be swung around as far as may be necessary toward the stop 70. When it is desired to shift the gears from reverse to neutral postion and cut off a part or all of the gasolene supply, the lever 65 will be swung back toward and by the stop 71, the spring dog 74 being pulled outwardly to pass said stop 71, and thereafter if it should be desired to primarily shift the gearing from neutral to first speed, the lever 65 will be swung toward the right, looking at Fig. 22, so as to change the transmission gear to first speed and provide for a proper supply of fuel to the engine. After the gears have been set for first speed, the segment lever 65 may be swung toward the right as far as may be desired or until the dog 74 reaches and becomes arrested by the stop 72, this movement of the lever 65 after the stage of first speed has been reached, being for the purpose of feeding the desired amount of fuel to the engine, since from first speed on, the speed of the vehicle will control the position or shifting of the transmission gears, subject however to the feed of the fuel to the engine which will be governed by the position of the sector lever 65 and its movement of the fuel controlling rod 61 with relation to the carbureter 60.

It will be understood therefore that the operator by manipulating the sector lever 65 may control the direction and speed of movement of the vehicle and also the quantity of gasolene or other fuel to pass from the carbureter to the engine, as well as the setting of the transmission gears in their neutral position or in reverse position or in position for first speed, and hereinafter I will describe the action which results from the movement of the rod 61 in its actuation of the bell-crank lever 62 and parts connected therewith. At this place I should mention that the steering mechanism illustrated in Fig. 34 is not a part of the present invention and that any suitable steering mechanism may be employed. I have applied the sector-lever 65 and rod 64 to the mechanism shown in Fig. 34 which comprises customary well-known steering mechanism. The steering wheel 68 is keyed to a tubular rod 76 (Fig. 34) which has a worm 77 and engages the customary steering features 78, 79 not necessary to be specifically referred to, because forming no part of the present invention and being well-known. I deem it more convenient to associate the sector 67, sector-lever 65 and operating rod 64 with the steering mechanism so that said sector and sector-lever may be conveniently situated with relation to the operator.

The fly-wheel and clutch-member 52 rigid with the engine-shaft 51 is of customary type, and likewise the friction clutch-member 53 is well known in this art and may be manipulated in the customary way. The clutch-member 53 is yieldingly pressed against the clutch-member 52 by means of a coiled spring 80, and said clutch-member at its outer end is formed with a head 81, which is in the shape of a flat disk, and said member 53 is, by means of customary arms 82, 83 and bar 84, these features constituting a well-known universal joint, connected with a brake-drum 85, which is keyed on the end of a shaft 86 leading into the gear-box 87, wherein said shaft 86 carries a gear-wheel 88 on one face of which is formed clutch-members 89. The inner end of the shaft 86 contains a longitudinal bore and receives the reduced circular end of a driving shaft 90 which, except at said end seated within the shaft 86, is generally of rectangular cross-section. The driving-shaft 90 extends through the gear-box 87, as shown at 91 in Fig. 8, and leads to the rear axle-drive mechanism of the vehicle or to other driving parts well-known in this art and not illustrated in the drawings.

Any suitable means may be provided on the car to engage the plate 81 for controlling the action of the clutch-member 53, and at present, for this purpose, I provide a rock-shaft 92, shown in detail in Fig. 32, carrying arms 93 having rollers 94 in engagement with the face of the plate 81, and this rock-shaft 92 may be actuated by the emergency brake-lever 95 (Fig. 33) to which the brake-rod 96 is connected and which rod, by means of a crank-arm 97, is connected with the rock-shaft 92. The rock-shaft 92 has a crank-arm 98 which, by means of a rod 99 is connected with a crank-arm 100 which is fastened on one end of a rod 101 constituting the hinge of an upper cover-plate 102 for the auxiliary casing 103, which is mounted upon the gear-box 87. The connection of the rod 96 with the crank-arm 97 is by means of a slot 104 and pin 105 (Fig. 33) so that lost motion is permitted in said connection, it not being desirable that the rock-shaft 92 should be turned with each movement of the rod 96. The manipulation of the clutch-member 53 may, therefore, be manually taken care of through the mechanism shown in Figs. 32 and 33 or by any other suitable mechanism. The purpose of connecting the rock-shaft 92 with the crank-arm 100 will be explained hereinafter. The brake-drum 85 having a universal joint connection with the clutch-member 53 is well-known in the art and therefore does not require specific description. It may be said, however, that said drum has a brake band 106 on it and that said band is operable through a rod 107, whose connections will be explained hereinafter. The band 106 is held at its lower end on a rigid rod 400 fastened to the gear box (Fig. 6).

The more essential novel features of the present invention reside in the mechanism within the gear-box 87, the mechanism in and connected with the superposed auxiliary casing 103, the means by which the gearing in the gear-box 87 may be manually shifted from neutral to first speed or to reverse positions and back to neutral whenever desired, and the mechanism, involving a governor 108 (Figs. 5 and 8), for automatically shifting the transmission gears from first to second and second to third and back to second and from second to first speed positions in accordance with the speed of the engine or vehicle.

I will first describe the mechanism within the gear-box 87 and refer to the several positions the gears have during their employment on a car, and thereafter I will describe the means by which these gears are shifted into their several positions.

Figure 10:
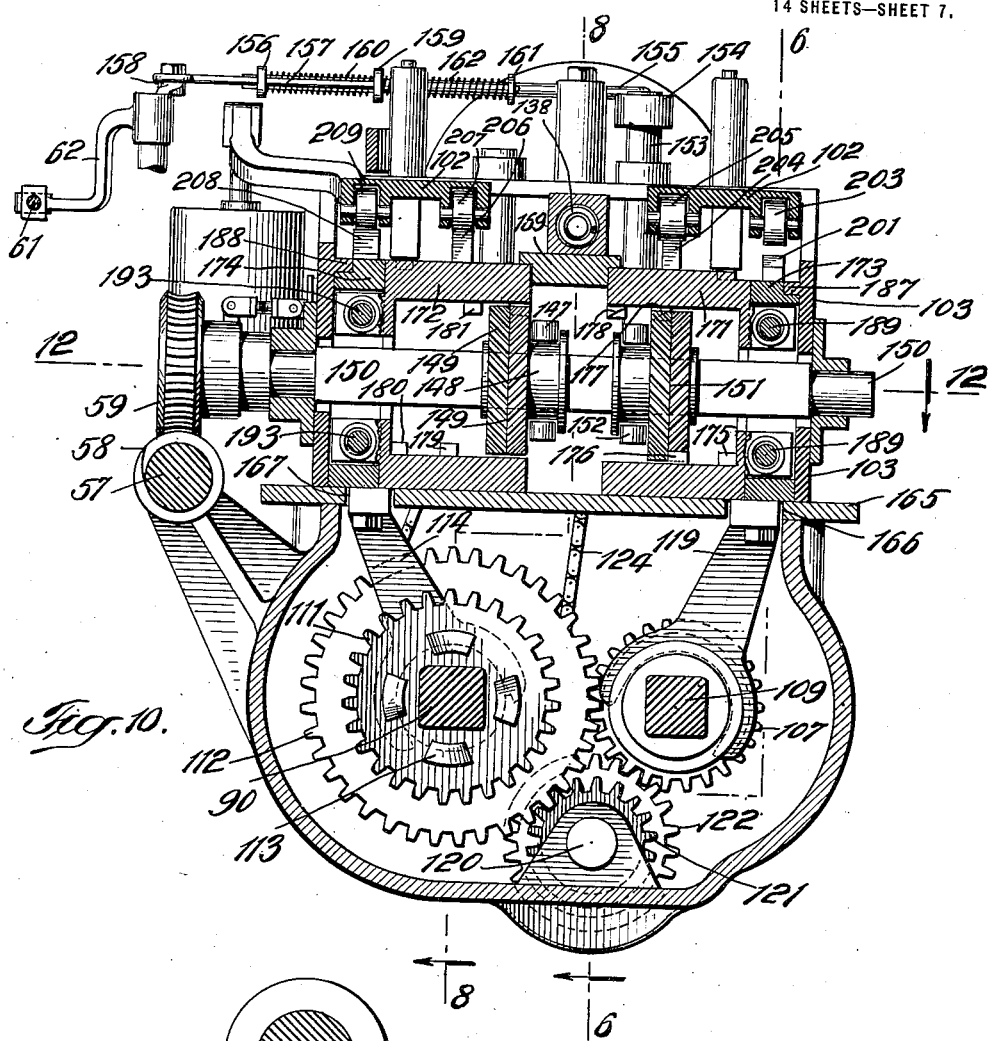
Fig. 10 is a transverse section through the mechanism of my invention, taken on the dotted line 10—10 of Fig. 6.

There are two parallel shafts within the gear-box 87, one of these shafts being the driving shaft 90 and the other being numbered 109, and the gear-wheels on these shafts 90 and 109, respectively, are clearly illustrated in Figs. 13, 15, 17, 19, 21 and 31. The fixed gear-wheel on the shaft 86 has been referred to hereinbefore and numbered 88. On the shaft 90 are two gear-wheels varying in diameter and connected together by a sleeve 110, and these two gear-wheels are numbered, respectively, 111 and 112, and they may be slid together on the shaft 90 toward and from the gear-wheel 88. The gear-wheel 111 has on one face certain clutch-members 113 adapted to be placed in engagement with the clutch-members 89 on the gear-wheel 88 when the vehicle is to be driven directly from the engine, this commonly being expressed as direct drive or high speed, and this relation of the gears is illustrated in Figs. 9 and 19. The sleeve 110 contains a groove which receives the lower end of a slidable fork 114 (Fig. 9) and this fork is moved by the means hereinafter described for shifting the gears 111 and 112 toward and from the gear-wheel 88. On the shaft 109 there is a fixed gear-wheel 115 which is always in mesh with the gear-wheel 88, and on said shaft 109 are also a fixed gear-wheel 116 and a smaller slidable gear-wheel 117 which is connected with an annularly grooved sleeve 118, the groove in said sleeve 118 being adapted to receive the lower end of a slidable fork 119 (Fig. 10) by which, as hereinafter explained, said gear-wheel 117 may be shifted on the shaft 109 to its several positions. Within the gear-box 87 there is an auxiliary shaft 120 suitably mounted in bearings, as shown in Fig. 6, and on said shaft there is a small gear-wheel 121 and a gear-wheel 122, both being rigid on the shaft 120. The relation of the shaft 120 to the shafts 90, 109, is shown in Fig. 10.

The neutral position of the several gear-wheels within the box 87 is shown in Fig. 13, in which it may be seen that the gear-wheels 88 and 115 are in mesh, that the gear-wheel 112 is in mesh with the pinion 121 and that the gear-wheel 117 is partly in mesh with the gear wheel 112. At this time the engine may be in motion, but no power will be transmitted from the shaft 90. I preferably leave the gear-wheel 117 partly in mesh with the gear-wheel 112 on moving from first to neutral, so as to obtain a convenient full engagement of said two gear-wheels when the gear wheel 117 is shifted to position for first speed, illustrated in Fig. 15. When the gears are in the position shown in Fig. 13, the movement of the gear wheel 117 to its position shown, results in the automatic freeing of the engine clutch through the arm 100 and connecting rod 99, hereinbefore referred to, and the mechanism through which the gear-wheel 117 is shifted and which acts against the engine clutch through the arm 100 and rod 99, will be described hereinafter.

When the gearing is to be set for first speed, the gear wheel 117 is shifted to the position in which it is shown in Fig. 15, in which position said gear-wheel 117 is in engagement with both the pinion 121 and gear-wheel 112, and in this position of the gear-wheel 117 the line of power will be from the shaft 86, gear-wheel 88, gear-wheel 115, shaft 109, gear-wheel 117 and gear-wheel 112, which will impart motion to the shaft 90.

When the gears are in second speed position (Fig. 17), the gear-wheel 112 will have become shifted from its engagement with the gear-wheel 117, and the gear-wheel 111 will have been moved into mesh with the gear-wheel 116, this movement of the gear-wheels 111 and 112 having been accomplished automatically and by the speed of the engine or vehicle, and at this time the line of power will be from the gear-wheel 88 to the gear-wheel 115 and through the shaft 109 and gear-wheel 116 to the gear-wheel 111 and shaft 90.

The third or high speed position of the gearing is shown in Fig. 19 wherein it may be seen that the gear-wheels 111, 112 have been shifted on the shaft 90 to such extent that the clutch-members 89 and 113 are in engagement, and that the engine shaft has a direct drive on the shaft 90. The movement of the gear-wheels 111, 112 to the position shown in Fig. 19 is accomplished automatically and due to the speed of the engine or vehicle. On a slowing up of the engine or vehicle, the gear-wheels 111, 112 will be automatically restored to their second speed position, shown in Fig. 17, and on a further slowing up of the engine or vehicle the gear-wheels 111, 112 will automatically return to their first speed position illustrated in Fig. 15.

Should it then be desired to reverse the direction of travel of the vehicle, the operator or driver will, through the sector lever 65, set in motion the intermediate mechanism by which the gear-wheel 117 will be moved toward its neutral position and finally into mesh with the gear-wheel 122 on the auxiliary shaft 120, or to the position shown in Fig. 21, and under this relation of the gears the power will be from the shaft 86 through the gear-wheel 88, gear-wheel 115, shaft 109, gear-wheel 117, gear-wheel 122, shaft 120, gear-wheel 121 and gear-wheel 112 to the shaft 90.

In Fig. 31 I illustrate the position of the transmission gears as about to be shifted from reverse to neutral positions by means of the sector lever 65, the gear-wheel 117 having been left partly in mesh with the gear-wheel 122 and ready to be shifted into mesh with the gear-wheel 112.

Within the gear-box 87 a sprocket gear-wheel 123 is secured on the shaft 90, and a chain 124 (Fig. 27) connects the wheel 123 with a pinion-wheel 125 secured on a tubular shaft 126 (Fig. 8), and motion is imparted from the shaft 90 through said chain 124 and said wheels 123, 125 to said shaft 126, and this shaft 126 and the mechanism connected or coöperating therewith have to do with the automatic setting of the transmission gears from first to second, second to third, back to second and back to first speed positions.

The tubular shaft 126 has pivotally secured to it one set of yokes 127 of the governor balls 128, whose other set of yokes 129 are pivotally secured to said balls and to a sleeve 130 which is slidably mounted on said shaft, the outer end 131 of the latter being mounted in a bearing 132 forming a part of an inclosing casing 333 within which the governor balls 128 are located. Within the tubular shaft 126 is a short rod 133 which is engaged by a cross-pin or key 134 extending transversely through the tubular portion of said shaft 126, which is slotted, as shown in Fig. 8, to permit said pin to slide longitudinally of said shaft 126. The pin or key 134 is secured to the inner portion of the sleeve 130, and as the governor balls 128 swing outwardly, the sleeve 130 is slid toward the pin 134 and causes said pin to press against the inner end of and move the rod 133. A coiled spring 135 resists the outward movement of the governor balls 128, but does not do so until said balls are about in a half-way outer position, said spring at that time becoming engaged between the bearings for the yoke arms 127 and the sleeve 130 and being compressed on any further outward movement of the governor balls 128. The spring 135 at the proper time and after the governor balls 128 have moved beyond the half-way outer position, may act to retract said balls to their half-way position when permitted so to do.

The inner end of the rod 133 bears, preferably through a ball-race 136, against the end of a rack-bar 137 which has one end entered within the tubular shaft 126 and its other end engaged by a coiled spring 138. The rack-bar 137 is guided within a frame or housing 239 and is adapted to have a sliding motion in one direction under the pressure of the rod 133 when said rod is moved against the same by the action of the governor balls 128 and in the opposite direction by the spring 138. The spring 138 is always under tension, and this tension is exerted in a direction to move the rack-bar 137 toward the short rod 133, one result of this being that the rod 133 is always kept pressed against the pin or key 134. It is obvious that when permitted so to do, the spring 138 by its pressure against the rod 133 may, through the pin or key 134 and sleeve 130 assist in closing the governor balls 128 toward their shaft. The tubular shaft 126 receives its motion through the sprocket chain 124 from the shaft 90, which is of course driven from the engine or vehicle, and hence said tubular shaft is always in motion when the shaft 90 is in motion and the position of the governor balls 128 will be in accordance with the speed developed by the engine or vehicle and imparted to the shaft 90. The rack-bar 137, however, has only a sliding motion, since its end which enters the tubular shaft 126, is circular in cross-section. The rack-bar 137 is yieldingly held in its several positions by means of a spring pawl 139 adapted to engage the respective notches 140 in said rack-bar, as shown in Fig. 8, said spring pawl being in the first of said notches reading from the left, when the gearing is in position for first speed, in the second of said notches when the gearing is in position for second speed, and in the third of said notches when the gearing is in position for third or high speed. The spring pawl 139 and notches 140 also serve as a resistance to the power developed by the governor and thus to effect the storing up of a power which, when the rack-bar 137 does move, causes said bar to move quickly or jump the space from one notch 140 to another, thereby causing a prompt engagement of the gear-wheel 149 with the respective racks of the frame 172, the lateral shifting of said gear-wheel 149 being accomplished quickly. The spring 138 is within a housing 141 and engages a rod 142 located therein and pivotally connected with a bell-crank 143, whose purpose will be hereinafter described.

One one side of the rack-bar 137 are a suitable number of gear-teeth 144 (Fig. 5) which are engaged by a horizontal segment 145 secured upon the upper end of a vertical shaft 146, whose lower portion, within the casing 103 carries a yoke or fork 147 (Fig. 8), which engages, as shown more clearly in Figs. 12, 14, 16, 18 and 20, the hub 148 of a gear-wheel 149 slidably mounted on a transverse shaft 150, and which shaft carries on its outer end the worm-wheel 59 and is driven in proper timing from the engine through the shaft 55 or other connection. The shaft 150 is always in motion when the engine is in operation, but said shaft does not perform any duty, except when the gear-wheel 149 or a companion gear-wheel 151 is in operative position, and these wheels are respectively set in operative position, the gear-wheel 149 by the centrifugal action of the governor balls 128 under the speed of the engine or vehicle, and the gear-wheel 151 by the manual action of the driver or operator through the segment lever 65. The gear wheels 149, 151 are slidable on the shaft 150, and the gear-wheel 149 slides in one direction or the other under the control of the vertical shaft 146 and yoke 147. The gear-wheel 151 slides under the action of a yoke 152 secured on a vertical shaft or rod 153 when said shaft is actuated by the sector lever 65, rod 61, bell-crank lever 62 and connections between said bell-crank lever 62 and a crank-arm 154 (Fig. 4) secured upon the upper end of said rod or shaft 153. The yoke 152 is actuated manually to shift the gear-wheel 151 for the purpose of accomplishing the positions of neutral, first speed and reverse speed, and the yoke 147 is actuated automatically by the position of the governor balls for setting the transmission gearing for second speed and high speed and back to second speed and to first speed.

The yoke 152 is actuated, as aforesaid, from the sector lever 65 through the medium of the rod 61, bell-crank 62 and an intermediate connection between said bell-crank 62 and the crank-arm 154 on the vertical shaft 153, and the said connection intermediate said bell-crank and crank-arm is shown more clearly in Figs. 4 and 10, in which it may be seen that the connection comprises a rod 155 which at one end is hooked into the end of the crank-arm 154 and at its other end is connected with a transverse plate 156 which is adapted to guide on the parallel arms 157 of a fork 158, which is pivotally connected with the bell-crank 62. The inner ends of the arms 157 of the fork 158 are connected by a transverse plate 159, and this plate has a hole through it through which the rod 155 may have a sliding motion. Between the transverse plates 156, 159 is confined on the rod 155, a coiled spring 160, and on the rod 155 and confined between the plate 159 and a collar 161 is a further coiled spring 162. When by means of the bell-crank 62 the fork 158 is pulled outwardly, the spring 160 becomes compressed between the plates 156, 159, while at the same time the rod 155 is being pulled to turn the crank arm 154 for the purpose of actuating the shaft 153. The spring 160 may, when released so to do, restore the fork 158 and rod 155 to initial position. When by means of the bell-crank 62 the fork 158 is pressed inwardly it will move the plate 159 against the spring 162, compressing said spring and pushing the rod 155 inwardly for the purpose of turning the crank-arm 154 and actuating the shaft 153. The spring 160 at its inner end presses against a small collar 163 which is free on the rod 155 and may be moved inwardly against the spring 160 when the fork 158 is pulled outwardly by the bell-crank 62. When the fork 158 is pressed inwardly against the spring 162, the collar 163 retains the spring 160 in normal condition, said collar then being against a small stop pin which prevents it from following the cross-plate 159. At the end of the spring 162 adjacent to the cross-plate 159 is a small collar 164, which is slidable on the rod 155. When the fork 158 is pulled outwardly against the stress of the spring 160, the collar 164 remains stationary, being against the aforesaid stop pin and does not follow the cross-plate 159. The collar 164 thus retains the spring 162 in normal condition when the fork 158 is pulled outwardly. The stop-pin which is engaged by the collars 163, 164 during the operation of the fork 158 and rod 155, is an individual pin extending through the rod 155, and while said pin serves to arrest either one of said collars, it does not interfere with the movement of the cross-plate 159, because said plate at its bore has a small recess capable of sliding in either direction over said pin. The springs 160, 162 cushion the thrusts of the fork 158 and rod 155, so that the movement of the crank-arm 154 and vertical shaft 153 are always cushioned.

The springs 160, 162 serve a further very important purpose. If, by means of the bell-crank, 62, operated from the sector-lever 65 and through the intermediate mechanism leading to the vertical shaft 153, I turn said shaft to change the transmission gearing from neutral position to position for first speed, the action of the segment lever permits the feeding of a certain amount of gas to the carbureter, and then if I desire to feed an additional amount of gas to the carbureter so as to increase the speed of the engine, I turn the bell-crank 62 further in the same direction, the compression of the spring 160 permitting me to do this and this compression being possible because the vertical shaft 153 has become arrested by the completion of its movement. The additional quantity of gas having been fed to the engine, and the engine having been speeded up thereby, the automatic mechanism will set the transmission gearing for second speed. If on the other hand I have moved the segment lever 65 and bell-crank lever 62 to first speed position and desire to shift the gearing to position for reversing, I will move said segment lever back to neutral position, this restoring the connections represented by the bell-crank 62, fork 158, rod 155 and shaft 153 to their neutral condition or position, and I will then continue the movement of the sector-lever 65 to reverse position, this acting to change the throw of the bell-crank lever 62, fork 58 and rod 55 so as to turn the shaft 153 accordingly to its opposite stop position, and since at this time it will be desired to feed gas to the carbureter, I will, by the action described, have moved the cross-plate 159 against and compressed the spring 162, so that while the transmission gearing is on reverse a proper quantity of gas may be fed to the carbureter for propelling the vehicle, the butterfly of the carbureter at this time opening in the opposite direction to that on which it opened when the car was going forward. The springs 160 and 162 constitute a sufficient portion of the rod 155 to enable me to set the gearing from neutral to first or from first to neutral and from neutral to reverse and from reverse to neutral and at the same time permit the continued movement of the sector-lever so as to permit the feeding of gas to the carbureter when I am on reverse or an increased feeding of the gas to the carbureter when I am on first position, the latter condition permitting the engine to speed up so that the gearing may be automatically shifted, due to the speed of the engine or vehicle, from first to second. I may also, due to the presence of the spring 162, move the sector-lever 65, when the gearing is in position for second speed, to feed a further increased quantity of gas to the engine, so that the engine may further speed up and the automatic mechanism, under the speed of the engine or vehicle, act to shift the transmission gearing to position for high speed. The spring 162 also serves to permit the gear-wheel 151 to shift in proper timing in instances in which the operator might move the rod 61 with undue suddenness or with a rapidity greater than that on which said gear-wheel should shift.

The casing 103 is preferably of rectangular outline and has a bottom plate 165 secured upon the top of the gear-box 87 and forming a partition between the casing 103 and gear-box 87, and said plate or partition 165 is slotted, as at 166 and 167, respectively, to permit the movement of the yoke arms 119, 114 during the setting of the transmission gears.

The shaft 150 carrying the gear-wheels 149, 151 extends through the casing 103, but has no sliding movement therein. The casing 103 has the hinged top-plate 102 hereinbefore referred to and also a stationary top-plate 168 (Fig. 4), and below said plate 168 and in line with a recess cut in the top-plate 102, a bar 169 is secured longitudinally of said casing 103 and near the top thereof. Upon the bar 169 is supported the housing 239 for the rack-bar 137 and also a housing 141 for the spring 138 and short rod 142.

Within the receptacle 103 are mounted two hollow horizontal frames 171, 172, respectively, which frames are of horizontal U-shape, and these frames are, respectively, connected with auxiliary frames, also slidable, 173, 174, respectively. The frames 173, 174 have a loose connection with the frames 171, 172 so as to be capable of certain movement independently thereof. The frames 171, 172, respectively, contain the gear-wheels 151, 149, as shown in Fig. 10, and also in Figs. 12, 14, 16, 18 and 20. The frames 171, 172 are each formed with two sets of rack-teeth on their bottom and at the lower side of their top, and the racks on the bottom of the sliding frame 171 I number 175, 176, respectively, and the racks on the under-surface of the top of said frame 171, I number 177 and 178, respectively. The racks on the bottom of the sliding frame 172 I number 179 and 180, respectively, and the racks at the under surface of the top of said frame 172 I number 181, 182, respectively. The gear-wheel 151 is manually shifted, as hereinbefore explained, and on the shifting of this gear-wheel it engages one or the other of the racks 175 and 176 or one or the other of the racks 177 and 178 rigid with the sliding frame 171, and said gear-wheel 151 being in rotation will slide said frame 171 in one direction or the other in accordance with which rack the gear-wheel may be in engagement with. When the frame 171 reaches its predetermined position governed by the length of the racks (which length is proportionate to the distance the transmission gears are to be shifted), the gear-wheel 151 will be free of the rack it engaged, due to the movement of the frame 171, as presently explained, and then the gear-wheel may continue in motion without affecting the frame 171.

The gear-wheel 149 when automatically shifted through the yoke 147 and vertical shaft 146 is caused to engage one or the other of the bottom racks 179, 180, or one or the other of the top racks 181, 182 of the sliding frame 172, and the purpose of the engagement of said gear-wheels with said racks of said frame 172 is to effect the sliding action of said frame 172 and the shifting of the transmission gears in the gear-box 87. The gear-wheel 149 will act with respect to the frame 172 the same as the gear-wheel 151 operates with respect to the frame 171.

The gear-wheel 151 will always engage one or the other of the bottom racks 175, 176 when the frame 171 is to be moved for shifting the gearing from reverse to neutral and from neutral to first position, and said gear-wheel will always engage one or the other of the top racks 177, 178 when sliding the frame 171 to effect the shifting of the gearing from first to neutral and neutral to reverse positions.

The gear wheel 149 will engage one or the other of the bottom racks 179, 180 on sliding the frame 172 to effect the shifting of the gearing from first to second and from second to third speed positions, and said gear-wheel 149 will engage one or the other of the top racks 181, 182 on sliding the frame 172 to shift the transmission gearing from third to second and from second to first positions. The movements of the frames 171, 172 are communicated to the auxiliary frames 173, 174 and by said frames to the yokes or forks 119 and 114, respectively, fastened to the lower edges thereof. The said yokes or forks are slid by said frames 173, 174 and are thereby caused to effect the shifting of the gearing in the box 87. The connection of the frames 173, 174 with the frames 171, 172 will presently be described.

The gear-wheels 151, 149 are exactly alike, and each is formed with two sets of oppositely inclined or diverging teeth, as shown in Figs. 12, 14, 16, 18, and on a larger scale in Fig. 3, to respectively engage the racks of the frames 171, 172. The racks just referred to are also formed with inclined teeth so that they may be engaged by the respective gear-wheels 151, 149. The ends of the teeth of the said racks, taking the racks 179, 180 as an example, are, as shown in Fig. 2, beveled inwardly at their ends as distinguished from having flat ends on a straight line, and the outer ends of the teeth of the gear-wheels 151, 149 are likewise beveled inwardly (Fig. 3), and the purpose of thus beveling the ends of the rack teeth and teeth of the gear-wheels is to facilitate the engagement of the teeth of the gear-wheels with the teeth of the racks, the beveled ends of the teeth serving to cause the almost immediate full engagement of the teeth of the gear-wheels with the teeth of the racks on the shifting of said gear-wheels, the result being that the danger of stripping the teeth from the gear-wheels or racks is entirely avoided, as they begin to drive only when in full engagement.

The top of the frame 171 is formed with three notches or recesses 183 (Fig. 5) which are respectively engaged by a vertical spring pin 184 which extends down through the plate 168; an example of this pin 184 is shown on a large scale in Fig. 7, which is a sectional view on the dotted line 7—7 of Fig. 4.

The recesses or notches 183 are of V-shape and the lower end of the pin 184 is of V-shape, and while one purpose of the notches or recesses and said pin is to yieldingly lock the frame 171 in its several positions, as neutral, reverse and first positions, an important function performed by said recesses and pin is to impart a slight continued movement of the frame 171 after the gear wheel 151 has moved said frame until the end of the rack engaged by it is at said gear wheel, and at this stage the pin 184 will be above one side of the recess 183 it is to engage, and by its downward spring pressure will force its way into the recess or to the position shown in Fig. 7, and in doing this will slide the frame 171 a slight distance outwardly or in a direction to carry the rack engaged by the wheel 151 away from said wheel, so that the gear wheel may continue in motion without affecting said rack or said frame 171. The V-shape of the recesses and the inverted V-shape of the pin 184 serve as cams to effect the slight further movement of the frame 171 necessary to clear the racks thereof from the gear wheel 151.

The frame 172 is also formed with recesses 185 corresponding with the recesses 183, and said recesses 185 are respectively engaged by a vertical pin 186 which extends downwardly through the plate 168 and corresponds with the pin 184, shown in Fig. 7, and the purpose of the recesses 185 and pin 186 is, as in the case of the recesses 183 and pin 184, to yieldingly lock the frame 172 in its several positions and in imparting a slight further movement to said frame 172 after the gear wheel 149 has completed its action against the rack of said frame it may have been in engagement with, so that said rack is moved entirely from the gear wheel 149 and said gear wheel may continue in motion without striking the rack or otherwise acting on the frame 172. The pin 186 will engage one of the recesses 185 in the initial position of the frame 172, the next recess 185, when the frame 172 has been slid to effect the shifting of the gearing from first to second speed position, and the third recess 185 when the frame 172 has been slid to effect the shifting of the gearing from second to third speed positions.

The frames 173, 174 are open rectangular frames of the outline represented in Fig. 6 and lie close against the outer sides of the frames 171, 172, as represented in Figs. 5 and 10. The frames 173, 174 rest on the partition plate 165 and at their upper outer edges are held down and guided by ribs 187, 188, as shown in Fig. 10. The frame 173 has two longitudinal rods 189 extending lengthwise between its ends, one rod being adjacent to the upper edge of the frame and the other adjacent to the lower edge of the frame, and these rods extend through lugs 190 which are rigid with the frame 171 and project into the outline formed by the frame 173. The rods 189 are free to slide within the lugs 190. Upon the rods 189 are two sets of springs 191 and 192, respectively. The springs 191, 192 are spaced apart by the washers at their inner ends, said washers being held against approaching each other beyond a predetermined position by means of small stop pins, shown in Fig. 6.

The frame 174 has two longitudinal rods 193 secured to and extending between the ends thereof, one rod being adjacent to the upper edge of the frame and the other adjacent to the lower edge of said frame, and these rods extend freely through lugs 194 which are rigid with the frame 172 and project into the outline formed by the frame 174. Upon the rods 193 are two sets of springs 195, 196, respectively, the outer ends of said springs bearing against the ends of the frame 174 and the inner ends of said springs bearing against washers 197 at opposite sides of said lugs 194.

The frame 173 is formed in its lower edge and near one end thereof with recesses 198, 199, shown in Fig. 6, which are elongated and of substantially the same length and coöperate with a spring pin 200 which projects upwardly through the partition plate 165 and is mounted in a suitable thimble, as shown. The pin 200 has a rounded upper end and is yieldable to the motion of the frame 173. The recesses 198, 199 and pin 200 perform a duty; it may be said here that the pin and recess 198 provide for the gears 117 and 122, being about one-half in mesh with each other, as shown in Fig. 31, on the shifting of the gearing to neutral from reverse positions; and that the recess 199 and pin 200 provide for the gear wheels 117 and 112 being about one-half in mesh, as shown in Fig. 13, on the shifting of the gearing from neutral to first positions. The recesses 198, 199 and pin 200 serve to maintain the frame 173 in correct position or in other words prevent the longitudinal shifting of said frame which might take place due to the fact of the space being left between the springs 191, 192 (Fig. 6). For illustration, referring to Fig. 6, it will be seen that the shoulder formed at one end of the recess 198 engages the pin 200 and in this condition the engagement of the end of said recess and said pin will prevent the frame 173 from shifting toward the right, which it might otherwise do owing to the aforesaid space or slack between the springs 191, 192.

When I go from first to neutral or from reverse to neutral, I release the engine clutch, leaving the transmission gear still in mesh, as shown in Figs. 13 and 31. The shifting of the gear wheels in the gear-box from the gear-wheels and racks in the receptacle 103 is enough to carry the gear-wheel 117 half way from alinement with the gear wheel 112, as shown in Fig. 13, or half way from alinement with the gear wheel 122 (Fig. 31). At this time the engagement of the gear wheels 117 and 112 could, if permitted so to do, drive the car, but they cannot do so, because the engine clutch has been disconnected through the cam projection 201 and coöperating parts hereinafter referred to. The spring pin 200 and recesses 198, 199, compel a differential motion between the frame 171 and the frame 173, the frame 171 traveling in advance of the frame 173, while the roller 203 is traveling up the inclines of the cam projection 201 to release the engine clutch, and due to this differential movement of said frames 171, 173 the gear wheels 117 and 112 (Fig. 13) and gear wheels 117 and 122 (Fig. 31) attain their partly in mesh relation shown.

The spacing apart of the springs 191, 192 permits the frame 171 to have a movement in excess of the movement of the frame 173. The frame 173 has a movement equal to the distance the transmission gears actuated from it are to be shifted. The frame 171 has a movement equal to the motion imparted to it by the gear-wheel 151, and the difference in movement between the frames 171, 173 is represented by the space between the lugs 190 and the adjacent ends of said springs 191, 192, and one purpose for providing this differential movement of said frames or the slack in the movement of the frame 173, is so that the slant of the cam projection 204, hereinafter referred to, may not be too abrupt, but of gradual inclination, thereby securing ease of movement in the mechanism.

The frame 173 is formed on its upper surface and about centrally thereof with a cam projection 201 (Figs. 5 and 6) which inclines upwardly at opposite ends from two recesses 202, and said cam projection 201 is below the horizontal plane of a roller 203 mounted in bearings at the lower side of the hinged plate or frame 102, as shown in Fig. 10. The projection 201 is adapted at the proper time to ride against the roller 203 and turn the frame or plate 102 upwardly on its hinged end, and this is for the purpose of actuating the crank arm 100 and rod 99 to turn the rock shaft 92 and apply the rollers 94 carried by the rods 93 against the plate or disk 81 for partly relieving the friction cone 53 from the engine clutch member 52. When the flat top or projection of the cam 201 is below and supports the roller 203 and hinged plate or frame 102, the gearing will always be on neutral. The riding of the cam projection 201 under the wheel 203 is always to turn said frame 102 upwardly on its hinged end and effect the partial release of the engine clutch. If I should go from neutral to first, the frame 173 would move frontwardly, as shown in Fig. 14, and then the cam projection 201 would ride from under the roller 203 and the clutch would be restored so that the power of the engine would become active. In going from first to neutral the rear inclined edge of the cam projection 201 would ride under the roller 203 and again turn the hinged frame 102 upwardly and partly release the engine clutch.

On the top of the sliding rack-frame 171 is provided an upwardly extending projection or cam 204 (Figs. 5 and 10), which is, during the movement of said frame 171, carried below a roller 205, corresponding with the aforesaid roller 203 and mounted in bearings at the lower side of the hinged plate or frame 102. The projection or cam 204 is taller than the cam 201, as shown in Fig. 10. The cam 204 passes below and engages the roller 205 and tilts the frame 102 upwardly for, through the crank 100 and rod 99, releasing the engine-clutch in the manner which will be understood from the foregoing description concerning the cam 201 and roller 203. The engine-clutch remains released or disengaged so long as the cam 204 is under the roller 205, and at this time the car is at rest and all of the gearing in the gear box stand stationary. At this time, however, the engine may be in motion. If at this time I should move the segment lever 65 and thereby shift or slide the frame 171 in either direction so as to move said frame from the position in which it is shown in Fig. 12 to the full reverse position or from such position to the position for first, shown in Fig. 14, there might be some danger if the engine-clutch were permitted to fully engage, that the teeth of the transmission gears might not easily and quickly pass into mesh, and to obviate any such difficulty, I provide the lower cam or projection 201 and roller 203 so that as the projection or cam 204 leaves its roller 205, said cam 201 and roller 203 may act to prevent the full engagement of the engine-clutch until the gears have had every necessary opportunity to engage each other. The engagement of the cam 201 with the roller 203 permits the engine-clutch parts to have only a slight dragging engagement sufficient to set the gear-wheels in motion, thereby permitting said gear-wheels if the teeth thereof should not be in correct alinement to drag a little and pass into proper mesh. The cam projection 201 and roller 203 constitute precautionary features to insure the proper engagement of the gear-wheels before the engine-clutch reaches its final operative condition or has its two members put into full driving contact with each other. If, for illustration, the gear-wheels 117 and 112 or the gear-wheels 117 and 122 should meet each other with the end faces of the teeth in direct contact, when the engine-clutch is only slightly in engagement, the resistance thereby created to the rotary motion of said gear-wheels would react through the yoke 119 against the frame 173 and result in retarding the movement of said frame so that said frame at that time would keep the engine-clutch members from passing into full engagement, this continuing until the resistance from the gear-wheels is released by the proper engagement of said gear-wheels with each other, and at that time, the springs 191 or 192 carried by said frame 173 and which became somewhat compressed due to the retardation of the movement of the frame 173 by the resistance thereto exerted through the yoke 119, will suddenly move said frame 173 to its proper ordinary relation to the frame 171, and when this happens the engine-clutch will be in full driving condition, both projections 201 and 204 having passed from the rollers 203 and 205.

The cam projection 201 on the frame 173 is desirable in any event, since it effects a sufficient release of the engine clutch to assure the meshing of the teeth of the transmission gears with ease and without danger of injury to them.

The rack-frame 172 having the top and bottom racks and coöperating with the frame 174 carrying the springs 195, 196 has hereinbefore been described with the exception of certain details connected or coöperating therewith, and I will now refer to these details.

On the top of the frame 172 are two separated upwardly extending approximately inverted V-shaped cam projections 206 (Fig. 5) for coöperation with a roller 207 mounted in bearings at the underside of the hinged crank-frame 102 (Fig. 10); and on the top of the auxiliary frame 174 are formed two cam projections 208 separated by a depression and having upwardly inclined front and rear end portions and which cam projections 208 coöperate with a roller 209 (Fig. 10) mounted in bearings at the lower side of the crank-frame 102. The cam projections 206 and 208 when riding against their respective rollers 207, 209 tilt the crank-frame 102 upwardly for the purpose of, through the crank-arm 100 and connecting rod 99, acting on the engine-clutch, in very much the same manner as the cam projection 204 on the sliding frame 171 and the cam projection 201 on the auxiliary frame 173 act against the hinged frame 102 and parts leading to the engine-clutch. When the rollers 207 and 209 are in the depressions between the projections 206 and 208, respectively, the transmission gearing will be on, position for second speed. When the forward projection 208 on the frame 174 is so moved, by the movement of the frame 174, that its lower forward surface is under the roller 209, the gearing will be on first speed, and when the rear lower portion of the rear projection 208 becomes below the roller 209, due to the sliding action of the frame 174, the gearing will be on third speed. When the intermediate depressions between the projections 206, 208 are below the rollers 207, 209, no function is being performed by said projections or rollers, since then said projections exert no influence on the hinged plate or frame 102. When the frame 172 is shifted from front to rear, it is on the reduction of the speed, and when said frame is shifted from rear to front, it is on the increase of speed, this also being true with respect to the frame 171. If the transmission gears actuated from the frame 174 should not, on the movement of said frame, go instantly into mesh, said frame will thereby be retarded but the frame 172 will continue its movement, compressing one pair of springs 195, 196 of the frame 174 sufficiently to oppose the momentum of the engine-clutch and finally assure said gears getting quickly into mesh. The resistance offered by the gears actuated from the frame 174 when said gears do not at once go into mesh, and the retardation in the movement of the frame 174 caused thereby, result in the projections 208 lifting the hinged frame 102 to sufficiently act on the engine-clutch to permit the gears to pass into proper mesh before said clutch is in complete final driving engagement. The projections 208 are, like the cam projection 201, precautionary features to assure the proper engagement of the transmission gears prior to the full engagement of the engine-clutch, and the projections 206, by elevating the frame 102, cuts off the power of the engine-clutch, leaving the engine in motion, but the transmission gears at rest.

Figure 11:
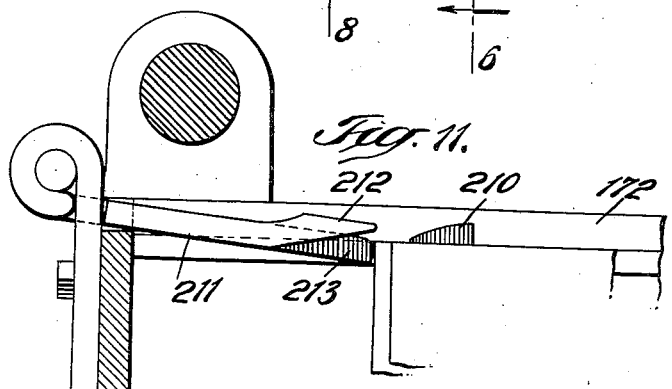
Fig. 11 is a vertical longitudinal section through a portion of the mechanism taken on the dotted line 11—11 of Fig. 5.

The sliding-frame 172 has at its forward end a cam projection 210 (Figs. 5, 9 and 11), and this projection 210, at the proper time, acts against a hinged dog 211 to lift the same, said dog 211 having an undercut portion 212 below which the projection 210 may ride and also having a stop member 213 in the path of the forward end of the spring-frame 174. The cam 210 also coacts with a pivoted dog 214 mounted on the arm 107 which is connected with the brake-band 106 for the brake-drum 85. It is desirable to tighten the band 106 on the brake-drum 85 so as to check the excessive speed action of the engine-clutch when the transmission gears are being shifted from first to second speed positions, and at this time the sliding rack-frame 172 being in motion, the cam 210 will be carried below and engage the dog 214 and through the same elevate the forward end of the arm 107 to tighten the band on the brake-drum. When the sliding-frame 172 starts to move the cam 210 below the dog 214, the band on the brake-drum starts to tighten and said band continues to be gradually tightened until the cam 210 is at the longer edge of the dog 214 and riding from under the dog, after which the arm 107 may drop and release the band from the brake-drum. The cam 210 is inclined downwardly and forwardly, and likewise the lower end of the dog 214 is inclined downwardly and forwardly, as shown in Fig. 29, so that there may be a gradual tightening of the band on the brake-drum and finally a sudden release of the arm 107 for freeing said band on said drum. The tightening of the band on the brake-drum continues until the gear-wheel 113 has reached and is ready to engage the gear-wheel 116. When the gear-wheel 113 is about to engage the gear-wheel 116, but is not in engagement with said gear-wheel, the engine-clutch is not in action, because at this moment one of the cam projections 206 has engaged and lifted the frame 102 for releasing said clutch. During the forward movement of the frame 174 it, before reaching the end of its stroke, will engage the part 213 of the dog 211 and will become arrested thereby, but the frame 172 will continue its movement and in doing so, the frame 174 having become arrested, will slightly compress the springs 196, storing up power therein, and this arresting of the frame 174, takes place at the time mentioned when the cam 210 and dog 214 are in such relation to each other as to hold the arm 107 at its maximum height and the brake-band 106 on the drum 85 with its maximum degree of tightness. When the frame 172 is sufficiently at the end of its forward stroke, the cam 210 thereon by riding under the undercut portion 212 of the dog 211 will turn said dog upwardly, and this will release the spring-frame 174 so that the stored-up power in its springs may slide said frame forwardly and effect the intermeshing of the gear-wheels 111 and 116. The stopping of the frame 174 is for the purpose of giving the brake-drum band time to act on the brake-drum, and this is during the period that the said gear-wheels 111, 116 are not in mesh. The brake-band is released from the brake-drum at the moment that the springs in the frame 174 throw said gear-wheels into mesh. The brake-band is tightened on the brake-drum 85 gradually, as the arm 107 is lifted by the engagement of the cam 210 with the dog 214, and at first said brake-band and brake-drum do not perform any special duty, since the car is then in motion and the gear-wheels 112 and 117 are still in mesh, not getting out of mesh until the gear-wheel 111 is shifted and ready to pass into mesh with the gear-wheel 116, and it is at this point that the frame 174 becomes arrested by the dog or plate 211. The dog 214 is cut off at a slant at its upper side, as shown in Fig. 29, so that on the return or backward movement of the frame 172 the cam 210 thereon may pass said dog 214 by tilting the same, but without acting on the arm 107. The hinged-plate or frame 102 is cut out, as shown in Fig. 4, so that the dog 214 may project downwardly into proper relation to the sliding frame 172, and a spring may be provided on the pivot of said dog 214, as shown in Fig. 4, so as to maintain it yieldingly in a normal position. The arm 107 is pivoted at its rear end and connected in any suitable way at its front end with the ends of the brake-band, as shown in Fig. 28, and the details of which connection are not of special importance. The brake-band 106 is made in two hinged together parts, and when the arm 107 is lifted, said parts close against the brake-drum, and when said arm 107 is allowed to drop, the members of the brake-band are released to a limited extent from the brake-drum due partly to the action of an interposed spring 215 (Fig. 28).

A further operative feature associated with the frame 172 and operable in one direction therefrom is the bell-crank lever 143 hereinbefore referred to. The bell-crank lever 143 (Fig. 8) is pivotally mounted in the bar 169, and the upper end of one arm thereof is pivotally connected with the forward end of the rod 142 which is adapted to have a sliding movement in the housing 141 and at its rear end is engaged by the forward end of the spring 138. The other arm of the bell-crank lever 143 normally projects downwardly and forwardly, as shown in Fig. 8, and stands in the path of a rigid arm 216 (Figs. 2, 8 and 9) carried by the frame 172. When the frame 172 is in its rear position, shown in Fig. 8, the bell-crank lever 143 does not perform any duty with the exception of resisting, by its engagement with the bar 169, the undue expansion of the spring 138, but when the frame 172 moves forwardly, the arm 216 carried thereby moves against the lower arm of the bell-crank lever 143 and lifting the same, turns the upper arm of said bell-crank lever rearwardly to press the rod 142 against and compress the spring 138. The compression of the spring 138 by the arm 216 and bell-crank lever 143 takes place on the shifting of the frame 172, under the action of the governors 128, to effect the change of gearing in the gear-box from first speed to second speed relation, and thereafter when the frame 172 makes a further movement, under the action of the governors 128, to shift the gearing to third, or high speed position, the spring 138 does not become further compressed, since at that time the upper surface of the arm 216 rides against the then flat lower horizontal surface of the lower arm of the bell-crank lever 143. And likewise there is no compression of the spring 138, for same reason, during the return movement of the frame 172 from third speed to second speed position. On the further rearward movement of the frame 172 to set the transmission gears from second to first speed positions, the bell-crank lever 143 becomes released from the arm 216 and takes the position shown in Fig. 8. The purpose of compressing the spring 138 is to create a storage power therein which compels the more rapid closing of the governor balls 128 than would be possible if said spring were absent. If the car had slowed up, the governor balls would close within a reasonable time and the rod 137 would be moved from second to first speed positions, but it is desirable many times not to slow up the car to such a material point as to permit the balls 128 to lose their momentum and close, and therefore I provide the spring 138 to accelerate the closing movement of the governor balls, so that I can go from second to first speed promptly without the necessity of slowing down the car. The spring 138 is always under some tension. The spring 138 is, therefore, to assist the prompt shifting of the transmission gears from second to first speed positions, and the spring 135 hereinbefore referred to acts to resist the outward movement of the governor balls 128 after they have reached or are at about in their half-way outer position, the purpose of the spring 135 being to prevent the governor balls from, through the rod 137 and its connections, shifting the frame 172 and the transmission gears at once to third position after the car has attained some momentum. The spring 138 serves to assist the closing of the governor balls, and the spring 135 acts to resist the undue outward movement of said balls, except when it is desired that the gearing should be placed on high speed.

It will be understood from what has been hereinbefore explained that during the movements of the sliding frames 171, 173 and 172, 174, the hinged plate 102 is caused through the crank-arm 100 and connecting rod 99 to release and permit the restoration in driving relation of the parts of the engine-clutch, and in order to prevent the sudden full engagement of the engine-clutch members, I connect the hinged plate 102 with means for checking such engagement of said members, so that the engine may gradually take up its load, instead of having the load thrown on it too suddenly, thereby insuring the gradual starting off instead of with a jerk or jump. The means for checking the turning downwardly of the hinged frame 102 to permit the resetting of the engine-clutch members is shown more clearly in Figs. 4, 5, 24, 25, 26, in which 217 designates a checking cylinder having a piston-rod 218 whose lower end carries the piston 219 and whose upper end is pivotally connected with an arm 220 extending rearwardly from one edge of the hinged-plate or frame 102, as shown in Fig. 4. The cylinder 217 is pivotally mounted on a stud 221 extending from the side of the casing or receptacle 103, as shown in Figs. 24 and 26, and in the base of said casing there is formed a hub 222 having a through transverse bearing in which a rotary shaft or valve stem 223 is mounted. The base of the cylinder 217 and said hub 222 have alined vent openings 224, 225, respectively, and the stem 223 has a vent opening 226 to be turned more or less into communication with the vent openings 224, 225 in accordance with the degree of resistance the air below the piston 219 is to exert to prevent the closing down of the hinged-plate or frame 102 and consequently the passing into driving engagement of the engine-clutch members. The cylinder 217 has an outlet vent 227 at its upper end and an inlet 228 for air at its lower end, the inlet 228 being equipped with a small check or flap valve 229, of ordinary type, to close the opening 228 on the down stroke of the piston 219. The stem or shaft 223 has fastened to one end a crank-arm 230 whose upper end is pivotally connected with a transversely extending rod 231 which has pivotally connected with its end, near the casing or receptacle 103, a pin 232 which extends through a hole 233 in the side of said casing or receptacle 103, as shown in Fig. 24, and at its rounded inner end bears against the side of the slidable frame 174. A plate spring 234 is secured against the side of the casing or receptacle 103 and at one end bears against a shoulder on said pin 232 to press the pin inwardly through the hole 233 and against the frame 174. It will appear obvious that when the hinged plate or frame 102 is turned upwardly, it will, through the arm 220, elevate the piston 219 and that when said plate or frame 102 turns downwardly it will depress the piston 219, at which time the air below the piston will operate to check not only the descent of the frame 102, but also the engagement of the engine-clutch members 53, 52. The crank-arm 230 has a coiled spring 235 connected with it, and the tension of this spring acting through the crank-arm 230 has a tendency to so turn the valve stem or shaft 223 as to substantially close the outlet vent through said stem or shaft and the bottom of the cylinder 217. It is not at all times necessary for the cylinder 217 and its parts to exercise their maximum checking effect on the plate or frame 102 and the engine-clutch members, and therefore I provide on the side surface of the frame 174 offset surfaces 236, 237 and 238, respectively, to be engaged by the pin 232 and act against the same to control the action of the spring 235 against the crank-arm 230. The surface 238 sets inwardly from the line of the surface 237, and the surface 237 sets inwardly from the line of the surface 236, as shown in Fig. 24, and said surface 236 is the general side surface of the frame 174. When the frames 172, 174 and pin 232 are in the position shown in Fig. 24, the surface 236 holds the pin 232 pressed outwardly, and at this time the spring 235 and crank-arm 230 act upon the stem or shaft 223 in a manner to hold the vent 225 almost entirely out of communication with the vents 224, 225, the outlet vent at the lower end of the cylinder 217 being then nearly closed. As the frame 174 moves forwardly with the frame 172, the surface 237 will pass into alinement with the pin 232 and then the spring 234 will press said pin inwardly, with the result of permitting the spring 235 acting through the crank-arm 230 to open, to a greater extent, the outlet vent at the bottom of the cylinder 217, and as the frame 174 moves forward to a still further extent, the more greatly depressed surface 238 will pass into the path of the pin 232 and the spring 234 will move said pin inwardly to the extent permitted by said surface 238, and this will result in the turning of the crank-arm 230 and valve-stem or shaft 223 to a position to open the vent at the bottom of the cylinder 217 to its full extent.

When the cam projection 204 is below the roller 205, the mechanism will be on neutral and the hinged plate or frame 102 will be in its upper position and hold the piston 219 in an upper position, and at this time the surface 236 of the frame 174 will be against the pin 232 and the vent at the bottom of the checking cylinder 217 will be in its maximum closed position, and this is because if the car is started after having been standing still, the engine has considerable load to take up, and I therefore so retard the engagement of the engine-clutch members as to avoid such jerk as might follow if the engine had to take up the entire load instantly, instead of with some graduation, but when the transmission gearing is to be shifted from first to second speed positions, the car has already attained speed and the engagement of the clutch-members does not require to be so much retarded, and therefore at this time the depressed surface 237 rides against the pin 232 and through the spring 234, compels an increased opening of the vent at the bottom of the cylinder 217; and when the transmission gearing is to be shifted from second to third speed positions, still less check is needed for the engine-clutch members, and therefore at that time the third or deeper surface 238 rides against the pin 232 and the spring 234 may, under such condition, effect further opening of the vent at the bottom of the cylinder 217.

The operation of the mechanism hereinbefore described will be understood without further extended explanation. It may be said, however, that the setting of the transmission gearing on neutral, reverse or first speed positions is under the manual control of the driver or operator and that the same is accomplished by the manipulation of the sector lever 65 and the connections intermediate said lever and the gear-wheel 151, by means of which the slidable rack-frame 171 and frame 173 are actuated to shift the proper gearing in the gear-box 87. The shifting of the gearing in the gear-box to second speed position and to third or high speed position is accomplished automatically by the speed of the car and the feed of the gas or fuel to the engine or motor, the automatic shifting of the gearing in the gear-box being accomplished through the gear-wheel 149, slidable rack-frame 172 and slidable frame 174 which is operatively connected with said frame 172. The gear-wheels 151 and 149 are slidable horizontally toward and from each other, and said gear-wheels are mounted on the shaft 150 which is operatively connected with the driving mechanism of the motor or engine. The gear-wheel 151 is manually operable from the sector lever 65, and the gear-wheel 149 is operated or moved to engage the respective racks of the frame 172 under the varying speeds of the car and under the actuation of the governor balls or centrifugal governor 128. The slidable frame 171 has lower racks 175, 176 and top racks 177 and 178; and the slidable frame 172 has lower racks 179 and 180 and top racks 181 and 182, the lower racks of the frame 172 being shown by full lines in Fig. 2 and the top or upper racks of said frame being illustrated by dotted lines in Fig. 24. In the construction shown the gear-wheels 151, 149 always engage the bottom racks of the frames 171, 172, respectively, when said frames are to be moved forwardly, and said gear-wheels always engage the top racks of said frames when said frames are to be moved rearwardly for shifting the gearing in the gear-box through the frames 173, 174, respectively, as hereinbefore explained. The bottom and top racks in the frames 171, 172, respectively, vary in length, as shown, so that the gear-wheels 151, 149 may be shifted laterally from one rack to another with entire convenience. The teeth on the right hand half of the gear-wheel 151 will engage the lower racks 175, 176 of the frame 171, and the teeth at the left hand side of said gear-wheel 151 may be placed in engagement with the teeth of the respective upper racks 177, 178 of said frame 171. The teeth on the left hand side of the gear-wheel 149 may be placed in mesh with the teeth of the lower racks 179, 180, respectively, of the frame 172, and the teeth on the right hand half of the gear-wheel 149 are adapted to engage the upper racks 181, 182, respectively, of the frame 172. The said racks of said frames 171, 172 vary in length and in their relation to one another, so that on the shifting of the gear-wheels 151, 149, said gear-wheels may be placed in mesh with the appropriate racks and effect the proper movement of the frames 171, 172 to set, through the auxiliary frames 173, 174, respectively, the transmission gears in their several positions for the car speeds. I make the gear-wheels 151, 149, respectively, as double gear-wheels, as shown, as a matter of convenience and advantage, and I provide each of the slidable frames 171, 172 with two racks at the bottom and two racks at the top for coöperation with said gear-wheels, this also being a matter of advantage in mechanical construction and convenience in operation.

The gear-wheel 151 is slidable manually for effecting the travel of the slidable frame 171 and its auxiliary frame 173, and the sliding movement of the gear-wheel 149 is accomplished automatically from the governor 128, and this last-mentioned feature of the operation I regard as of special importance. The governor balls 128 are retarded against going to their full open position by the spring 135, and said governor balls 128 are assisted in their closing movement by the spring 138, as hereinbefore described.

Many of the details of operation have been explained hereinbefore, and they need not be repeated at this time. I may add, however, that I regard the hinged frame 102 as very desirable, since it acts through the rod 99 to free the engine-clutch whenever the transmission gears are to be shifted from one position to another. The frame 102 is also of importance in that when it is moved upwardly by the cam projection 204, it releases the clutch at a time when the transmission gears are still in mesh on neutral, so that in effect the frame 102 creates and controls the neutral position of the transmission gears, permitting said gears always to remain in mesh. Ordinarily, when transmission gears are shifted to neutral, they are placed out of mesh, leaving the engine-clutch engaged, while in my construction I release the engine-clutch and leave the gears in mesh.

It may be said in conclusion that the gear-wheel 151 is shifted manually and the gear-wheel 149 automatically or, in other words, so set that the shaft 150 driven from the engine may effect the shifting of the transmission gears. The driving shaft 90 is connected up to operate the governors by which the automatic shifting of the gear-wheel 149 is accomplished. The gear-wheels 151, 149 are shifted or set to perform a certain duty, and, when positioned, the shaft 150, through said gear-wheels, may effect the shifting of the transmission gears. It is to be observed that if the car is in motion and the engine-clutch released, the shaft 90 will continue in motion under the speed of the car and that the speed of the car will, from said driving shaft 90, control the position of the governor. At all times the speed of the car, acting through the driving shaft 90, will actuate the governor and control the position, due to the governor, of the gear-wheel 149.

I do not limit my invention to all of the details of construction and operation hereinbefore specified, since I am aware that many of these details may be modified in many ways within the skill of an expert mechanic or engineer. I have sought to point out the best construction known to me at this time for carrying my invention into effect, and I am aware that with the construction shown and described, the invention is entirely operative and highly advantageous. My invention is not limited to the special transmission gears in the gear-box, since I propose to employ the more essential features of my invention in connection with the different styles of transmission employed in the various makes of motor vehicles.

Without, therefore, limiting my application to details of form, arrangement or construction, otherwise than the appended claims may require, what I claim and desire to secure by Letters Patent, is:

1. In a motor vehicle, in combination, a driving shaft, transmission mechanism variable for different speeds, a centrifugal governor operatively connected with and actuated from the driving shaft, and means intermediate said governor and said mechanism and adapted to be set by the governor and operated by the engine for automatically varying said mechanism for different speeds.

2. In a motor vehicle, in combination, a driving shaft, transmission mechanism variable for different speeds, a centrifugal governor operatively connected with and actuated from the driving shaft, means intermediate said governor and said mechanism and adapted to be set by the governor and operated by the engine for automatically varying said mechanism for different speeds, and means for automatically and yieldingly resisting the action of the governor after said mechanism has been positioned for one speed.

3. In a motor vehicle, in combination, a driving shaft, transmission mechanism variable for different speeds, a centrifugal governor operatively connected with and actuated from the driving shaft, means intermediate said governor and said mechanism and adapted to be set by the governor and operated by the engine for automatically varying said mechanism for different speeds, and means for automatically and yieldingly resisting the action of the governor in setting the mechanism for speeds of increasing ratio.

4. In a motor vehicle, in combination, a driving shaft, transmission mechanism variable for different speeds, a centrifugal governor operatively connected with and actuated from the driving shaft, means intermediate said governor and said mechanism and adapted to be set by the governor and operated by the engine for automatically varying said mechanism for different speeds, means for automatically and yieldingly resisting the action of the governor in setting the mechanism for speeds of increasing ratio, and means for automatically assisting said governor in its reverse action on said mechanism for speeds of decreasing ratio.

5. In a motor vehicle, in combination, a driving shaft, transmission mechanism variable for different speeds, a centrifugal governor operatively connected with and actuated from the driving shaft, means intermediate said governor and said mechanism and adapted to be set by the governor for automatically varying said mechanism for different speeds, a spring yieldingly resisting the action of the governor after said mechanism has been positioned for one speed, and a spring for aiding the governor in its reverse action on said mechanism after said mechanism has been advanced to a higher speed position and is to be positioned for a slower speed.

6. In a motor vehicle, in combination, a driving shaft, transmission gearing shiftable to vary the speed, a centrifugal governor operatively connected with and actuated from the driving shaft, and means intermediate said governor and said gearing and adapted to be set by said governor and operated by the engine for automatically shifting said gearing for different speeds.

7. In a motor vehicle, in combination, a driving shaft, transmission gearing shiftable to vary the speed, a centrifugal governor operatively connected with and actuated from the driving shaft, mechanism intermediate said governor and said gearing and adapted to be set by said governor and operated by the engine for automatically shifting said gearing for different speeds, and means for yieldingly locking said mechanism in its several positions.

8. In a motor vehicle, in combination, a driving shaft, transmission gearing shiftable to vary the speed, a centrifugal governor operatively connected with and actuated from the driving shaft, mechanism intermediate said governor and said gearing and adapted to be set by said governor and operated by the engine for automatically shifting said gearing for different speeds, means for yieldingly locking said mechanism in its several positions, and means for automatically and yieldingly resisting the action of the governor in setting the mechanism for a speed of an increased ratio.

9. In a motor vehicle, in combination, a driving shaft, two sets of transmission mechanisms variable for different speeds, manually operative means for varying one set of said mechanisms from neutral to first speed or to reverse positions and at the same time admit fuel to the engine, a centrifugal governor operatively connected with and actuated from the driving shaft, and means intermediate said governor and the other set of said mechanisms and adapted to be set by the governor and operated by the engine for automatically varying said mechanism for different speeds above first speed.

10. In a motor vehicle, in combination, a driving shaft, two sets of transmission mechanisms variable for different speeds, manually operative means for varying one set of said mechanisms from neutral to first speed or to reverse positions and at the same time admit fuel to the engine, a centrifugal governor operatively connected with and actuated from the driving shaft, means intermediate said governor and the other set of said mechanisms and adapted to be set by the governor and operated by the engine for automatically varying said mechanism for different speeds above first speed, and means for automatically and yieldingly resisting the action of the governor in varying said mechanism for a speed of an increased ratio.

11. In a motor vehicle, in combination, a driving shaft, two sets of transmission gears independently shiftable to vary the speed, manually operative means for shifting one set of gears from neutral to first speed or to reverse positions and at the same time admit fuel to the engine, a centrifugal governor operatively connected with and driven from the driving shaft, and means intermediate said governor and the other set of gears and adapted to be set by the governor and operated by the engine for automatically shifting said gears for different speeds above first speed.

12. In a motor vehicle, in combination, a driving shaft, two sets of transmission gears independently shiftable to vary the speed, manually operative means for shifting one set of gears from neutral to first speed or to reverse positions and at the same time admit fuel to the engine, a centrifugal governor operatively connected with the driving shaft, means intermediate said governor and the other set of gears and adapted to be set by the governor and operated by the engine for automatically shifting said gears for different speeds above first speed, and means for automatically and yieldingly resisting the action of the governor in setting the mechanism for a speed of increased ratio.

13. In a motor vehicle, in combination, two sets of transmission mechanisms variable for different speeds, manually operative means for varying one set of said mechanisms from neutral to first speed or to reverse positions and at the same time admit fuel to the engine, and means intermediate the engine and the other set of said mechanisms for automatically varying said mechanism for different speeds above first speed.

14. In a motor vehicle, in combination, two sets of transmission gears independently shiftable to vary the speed, manually operative means for shifting one set of said gears from neutral to first speed or to reverse positions and at the same time admit fuel to the engine, and means intermediate the engine and the other set of gears for automatically shifting said gears for different speeds above first speed.

15. In a motor vehicle, in combination, two sets of transmission mechanisms variable for different speeds, manually operative means for varying one set of said mechanisms from neutral to first speed or to reverse positions and at the same time admit fuel to the engine, and means intermediate the engine and the other set of said mechanisms for automatically varying said mechanism for speeds above first speed, said manually operative means comprising a single lever with connections leading therefrom to the fuel supply means and connections leading to said one set of mechanism.

16. In a motor vehicle, in combination, two sets of transmission gears independently shiftable to vary the speed, manually operative means for shifting one set of said gears from neutral to first speed or to reverse positions and at the same time admit fuel to the engine, and means intermediate the engine and the other set of gears for automatically shifting said gears for speeds above first speed, said manually operative means comprising a single lever with connections leading therefrom to the fuel supply means and connections leading to said one set of gears and having yieldable sections to permit further movement of said lever to admit an increased quantity of fuel to the engine after said gears have been positioned.

17. In a motor vehicle, in combination, two sets of transmission gears independently shiftable to vary the speed, manually operative means for shifting one set of said gears from neutral to first speed or to reverse positions and at the same time admit fuel to the engine, and means intermediate the engine and the other set of gears for automatically shifting said gears for speeds above first speed, said manually operative means comprising a single lever with connections leading therefrom to the fuel supply means and to said one set of gears and having spring-yielding sections to permit further movement of said lever to admit an increased quantity of fuel to the engine after said gears have been positioned.

18. In a motor vehicle, in combination, two sets of transmission gears independently shiftable to vary the speed, manually operative means for shifting one set of said gears from neutral to first speed or to reverse positions and at the same time admit fuel to the engine, a centrifugal governor operatively connected with the driving shaft, and means intermediate said governor and the other set of gears and adapted to be set by the governor and driven by the engine for automatically shifting said gears for speeds above first speed.

19. In a motor vehicle, in combination, transmission gearing shiftable to vary the speed, a slidable rack-frame having upper and lower racks offset from each other, an auxiliary slidable frame yieldably connected therewith and having a yoke for shifting the gears, a transverse shaft extending through said rack-frame and driven from the engine, a gear-wheel slidable on said shaft and keyed thereto and adapted to be placed in mesh with said racks respectively for sliding said frames to set the transmission gears, and means for shifting said gear wheel to engage the said racks respectively.

20. In a motor vehicle, in combination, transmission gearing shiftable to vary the speed, a slidable rack-frame having two upper racks and two lower racks offset from the vertical planes of said upper racks, an auxiliary slidable frame yieldably connected therewith and connected with the shiftable gears for shifting the same, a transverse shaft extending through said rack-frame and driven from the engine, a gear-wheel slidable on said shaft and keyed thereto and adapted to be placed in mesh with said racks respectively for sliding said frames to set the transmission gears, and means for shifting said gear-wheel to engage said respective racks.

21. In a motor vehicle, in combination, transmission gearing shiftable to vary the speed, a slidable rack-frame having two upper racks and two lower racks offset from the vertical planes of said upper racks, an auxiliary slidable frame yieldably connected therewith and connected with the shiftable gears for shifting the same, a transverse shaft extending through said rack-frame and driven from the engine, a gear-wheel slidable on said shaft and keyed thereto and adapted to be placed in mesh with said racks respectively for sliding said frames to set the transmission gears, means for shifting said gear-wheel to engage said respective racks, and means for automatically sliding said rack-frame a slight distance beyond its movement caused by said gear-wheel so as to free the rack engaged by the gear-wheel therefrom, thereby permitting the gear-wheel to have constant rotation.

22. In a motor vehicle, in combination, transmission gearing shiftable to vary the speed, a slidable rack-frame having two upper racks and two lower racks off-set from the vertical planes of said upper racks, an auxiliary slidable frame yieldably connected therewith and connected with the shiftable gears for shifting the same, a transverse shaft extending through said rack-frame and driven from the engine, a gear-wheel slidable on said shaft and keyed thereto and adapted to be placed in mesh with said racks respectively for sliding said frames to set the transmission gears, and means for shifting said gear-wheel to engage said respective racks, said racks having inclined teeth beveled inwardly at their ends, and said gear-wheel having two sections formed with oppositely inclined teeth to engage said racks and beveled inwardly at their outer ends.

23. In a motor vehicle, in combination, transmission gearing shiftable to vary the speed, a slidable rack-frame having two upper racks and two lower racks off-set from the vertical planes of said upper racks, an auxiliary slidable frame yieldably connected therewith and connected with the shiftable gears for shifting the same, a transverse shaft extending through said rack-frame and driven from the engine, a gear-wheel slidable on said shaft and keyed thereto and adapted to be placed in mesh with said racks respectively for sliding said frames to set the transmission gears, and means for shifting said gear-wheel to engage said respective racks, said racks having inclined teeth, and said gear-wheel having two sections formed with oppositely inclined teeth to engage said racks, with the teeth on one section in staggered relation to the teeth on the other section.

24. In a motor vehicle, in combination, transmission gearing shiftable to vary the speed, a sliding rack frame having two upper racks and two lower racks offset from the vertical planes of said upper racks and said frame being connected with the shiftable gears for effecting the sliding of the same, a transverse shaft extending through said rack-frame and driven from the engine, a gear-wheel slidable on said shaft and keyed thereto and adapted to be placed in mesh with said racks respectively for sliding said frame to set the transmission gears, and means for shifting said gear-wheel on said shaft to engage said respective racks.

25. In a motor vehicle, in combination, transmission gearing shiftable to vary the speed, a sliding rack frame having two upper racks and two lower racks offset from the vertical planes of said upper racks and said frame being connected with the shiftable gears for effecting the sliding of the same, a transverse shaft extending through said rack-frame and driven from the engine, a gear-wheel slidable on said shaft and keyed thereto and adapted to be placed in mesh with said racks respectively for sliding said frame to set the transmission gears, and means for shifting said gear-wheel on said shaft to engage said respective racks, said racks having inclined teeth beveled inwardly at their ends, and said gear-wheel having two sections formed with oppositely inclined teeth to engage said racks and beveled inwardly at their outer ends.

26. In a motor vehicle, in combination, transmission gearing shiftable to vary the speed, a sliding rack frame having two upper racks and two lower racks offset from the vertical planes of said upper racks and said frame being connected with the shiftable gears for effecting the sliding of the same, a transverse shaft extending through said rack-frame and driven from the engine, a gear-wheel slidable on said shaft and keyed thereto and adapted to be placed in mesh with said racks respectively for sliding said frame to set the transmission gears, and means for shifting said gear-wheel on said shaft to engage said respective racks, said racks having inclined teeth, and said gear-wheel having two sections formed with oppositely inclined teeth to engage said racks, with the teeth on one section in staggered relation to the teeth on the other section.

27. In a motor vehicle, in combination, two sets of transmission gears shiftable to vary the speed, two independent slidable rack-frames independently connected with the respective sets of gears for effecting the shifting of the same and each frame having two upper racks and two lower racks offset from the vertical planes of said upper racks, a transverse shaft extending through said rack-frames and driven from the engine, gear-wheels independently slidable on said shaft within said rack-frames and keyed to said shaft and adapted to be placed in mesh with said racks respectively of the separate frames for sliding said frames to set the transmission gears, manually operative means for shifting one of said gear-wheels to engage the respective racks of one of said frames for shifting one set of said gears from neutral to first speed and to reverse positions and at the same time admit fuel to the engine, and automatic means connected with the driving shaft for automatically engaging the other gear-wheel on said shaft with the respective racks of the other rack-frame for sliding the same and shifting the other set of transmission gears for speeds above first speed.

28. In a motor vehicle, in combination, two sets of transmission gears shiftable to vary the speed, two independent slidable rack-frames independently connected with the respective sets of gears for effecting the shifting of the same and each frame having two upper racks and two lower racks offset from the vertical planes of said upper racks, a transverse shaft extending through said rack-frames and driven from the engine, gear-wheels independently slidable on said shaft within said rack-frames and keyed to said shaft and adapted to be placed in mesh with said racks respectively of the separate frames for sliding said frames to set the transmission gears, manually operative means for shifting one of said gear-wheels to engage the respective racks of one of said frames for shifting one set of said gears from neutral to first speed and to reverse positions and at the same time admit fuel to the engine, and automatic means connected with the driving shaft for automatically engaging the other gear-wheel on said shaft with the respective racks of the other rack-frame for sliding the same and shifting the other set of transmission gears for speeds above first speed, said manually operative means comprising a single lever with connections leading therefrom to the fuel supply means and connections leading to said one gear-wheel the manually operative means is intended to shift, and said connections having yieldable sections to permit further movement of said lever to admit an increased quantity of fuel to the engine after said one set of transmission gears have been shifted from neutral position to position for first speed.

29. In a motor-vehicle, in combination, two sets of transmission gears shiftable to vary the speed, two independent slidable rack-frames independently connected with the respective sets of gears for effecting the shifting of the same and each frame having two upper racks and two lower racks offset from the vertical planes of said upper racks, a transverse shaft extending through said rack-frames and driven from the engine, gear-wheels independently slidable on said shaft within said rack-frames and keyed to said shaft and adapted to be placed in mesh with said racks respectively of the separate frames for sliding said frames to set the transmission gears, manually operative means for shifting one of said gear-wheels to engage the respective racks of one of said frames for shifting one set of said gears from neutral to first speed and to reverse positions and at the same time admit fuel to the engine, and automatic means connected with and actuated from the driving shaft for automatically engaging the other gear-wheel on said shaft with the respective racks of the other rack-frame for sliding the same and shifting the other set of transmission gears for speeds above first speed, said automatic means comprising a centrifugal governor with connections leading thereto from the driving shaft and connections leading therefrom to said other gear-wheel on said transverse shaft for sliding the same.

30. In a motor vehicle, in combination, transmission gearing shiftable to vary the speed, a slidable rack-frame having two upper racks and two lower racks offset from the vertical planes of said upper racks, an auxiliary slidable frame yieldably connected therewith and connected with the shiftable gears for shifting the same, a transverse shaft extending through said rack-frame and driven from the engine, a gear-wheel slidable on said shaft and keyed thereto and adapted to be placed in mesh with said racks respectively for sliding said frames to set the transmission gears, and means for shifting said gear-wheel to engage said respective racks, said auxiliary frame being connected with said rack-frame by means of lugs extending from said rack-frame into said auxiliary frame, horizontal rods extending freely through said lugs and secured at their ends to the ends of said auxiliary frame and springs on said rods between said lugs and said ends of said auxiliary frame.

31. In a motor vehicle, in combination, two sets of transmission gears shiftable to vary the speed, two independent slidable rack-frames independently connected with the respective sets of gears for effecting the shifting of the same and each frame having two upper racks and two lower racks offset from the vertical planes of said upper racks, a transverse shaft extending through said rack-frames and driven from the engine, gear-wheels independently slidable on said shaft within said rack-frames and keyed to said shaft and adapted to be placed in mesh with said racks respectively of the separate frames for sliding said frames to set the transmission gears, manually operative means for shifting one of said gear-wheels to engage the respective racks of one of said frames for shifting one set of said gears from neutral to first speed and to reverse positions and at the same time admit fuel to the engine, and automatic means connected with the driving shaft for automatically engaging the other gear-wheel on said shaft with the respective racks of the other rack-frame for sliding the same and shifting the other set of transmission gears for speeds above first speed, said manually operative means comprising a single lever with connections leading therefrom to the fuel supply means and connections to the gear-wheel said manually operative means is intended to shift, and comprising a rod connected with said lever, a bell-crank having one arm connected with said rod, a two-part rod connected with the other arm of said bell-crank lever, the parts of said rod being slidable on each other and having independent springs at opposite sides of their point of connection, a crank-arm connected with the other end of said two-part rod, a vertical shaft to which said crank-arm is connected and a yoke secured on said shaft and engaging said one gear-wheel.

32. In a motor vehicle, in combination, transmission gearing shiftable to vary the speed, a sliding rack-frame having two upper racks and two lower racks offset from the vertical planes of said upper racks and said frame being connected with the shiftable gears for effecting the sliding of the same, a transverse shaft extending through said rack-frame and driven from the engine, a gear-wheel slidable on said shaft and keyed thereto and adapted to be placed in mesh with said racks, respectively, for sliding said frame to set the transmission gears, and automatic means for shifting the said gear-wheel on said shaft to engage said respective racks and comprising a centrifugal governor operatively connected with the driving shaft, a slidable rack-bar operatively connected with said governor, a segment in engagement with said rack-bar, a vertical shaft on which said segment is secured and a yoke secured on said vertical shaft and engaging said gear-wheel.

33. In a motor vehicle, in combination, transmission gearing shiftable to vary the speed, a sliding rack-frame having two upper racks and two lower racks offset from the vertical planes of said upper racks and said frame being connected with the shiftable gears for effecting the sliding of the same, a transverse shaft extending through said rack-frame and driven from the engine, a gear-wheel slidable on said shaft and keyed thereto and adapted to be placed in mesh with said racks, respectively, for sliding said frame to set the transmission gears, and automatic means for shifting the said gear-wheel on said shaft to engage said respective racks and comprising a centrifugal governor having on its shaft a sprocket-wheel, a sprocket-wheel on a driving shaft in the gear-box connected by a chain with said sprocket-wheel on the governor shaft, whereby the governor becomes operatively connected with said driving shaft, a slidable rack-bar operatively connected with said governor, a segment in engagement with said rack-bar, a vertical shaft on which said segment is secured, and a yoke secured on said vertical shaft and engaging said gear-wheel.

34. In a motor vehicle, in combination, transmission gearing shiftable to vary the speed, a slidable rack-frame having upper and lower racks in different vertical planes, an auxiliary slidable frame yieldably connected therewith and connected with the shiftable gears for shifting the same, a transverse shaft extending through said rack-frame and driven from the engine, a gear-wheel slidable on said shaft and keyed thereto and adapted to be placed in mesh with said racks respectively for sliding said frames to set the transmission gears, means for shifting said gear wheel to engage said respective racks, an engine-clutch and means for relieving said clutch automatically from said frames when the transmission gears are to be shifted from one position to another.

35. In a motor vehicle, in combination, transmission gearing shiftable to vary the speed, a slidable rack-frame having upper and lower racks in different vertical planes, an auxiliary slidable frame yieldably connected therewith and connected with the shiftable gears for shifting the same, a transverse shaft extending through said rack-frame and driven from the engine, a gear-wheel slidable on said shaft and keyed thereto and adapted to be placed in mesh with said racks respectively for sliding said frames to set the transmission gears, means for shifting said gear wheel to engage said respective racks, an engine-clutch and means for relieving said clutch automatically from said frames when the transmission gears are moved to neutral position, thereby permitting said gears in said position to remain in mesh.

36. In a motor vehicle, in combination, transmission gearing shiftable to vary the speed, a slidable rack-frame having upper and lower racks in different vertical planes, an auxiliary slidable frame yieldably connected therewith and connected with the shiftable gears for shifting the same, a transverse shaft extending through said rack-frame and driven from the engine, a gear-wheel slidable on said shaft and keyed thereto and adapted to be placed in mesh with said racks respectively for sliding said frames to set the transmission gears, means for shifting said gear wheel to engage said respective racks, an engine-clutch, a hinged frame (102) connected therewith, and projections on said slidable frames to engage said hinged frame and move it to relieve the clutch when the transmission gears are to be shifted from one position to another.

37. In a motor vehicle, in combination, transmission gearing shiftable to vary the speed, a slidable rack-frame having upper and lower racks in different vertical planes, an auxiliary slidable frame yieldably connected therewith and connected with the shiftable gears for shifting the same, a transverse shaft extending through said rack-frame and driven from the engine, a gear-wheel slidable on said shaft and keyed thereto and adapted to be placed in mesh with said racks respectively for sliding said frames to set the transmission gears, means for shifting said gear wheel to engage said respective racks, an engine-clutch, a hinged frame (102) connected therewith, projections on said slidable frames to engage said hinged-frame and move it to relieve the clutch when the transmission gears are to be shifted from one position to another, and an air-check connected with said hinged frame for controlling the downward movement of the same after said projections have moved to permit said hinged frame to close downwardly.

38. In a motor vehicle, in combination, transmission gearing shiftable to vary the speed, a slidable rack-frame having upper and lower racks in different vertical planes, an auxiliary slidable frame yieldably connected therewith and connected with the shiftable gears for shifting the same, a transverse shaft extending through said rack-frame and driven from the engine, a gear-wheel slidable on said shaft and keyed thereto and adapted to be placed in mesh with said racks respectively for sliding said frames to set the transmission gears, means for shifting said gear wheel to engage said respective racks, an engine-clutch, a hinged frame (102) connected therewith, projections on said slidable frames to engage said hinged-frame and move it to relieve the clutch when the transmission gears are to be shifted from one position to another, an air-check connected with said hinged frame for controlling the downward movement of the same after said projections have moved to permit said hinged frame to turn downwardly, and means for varying the vent opening of said air-check in the different positions of said auxiliary slidable frame.

39. In a motor vehicle, in combination, transmission gearing shiftable to vary the speed, a slidable rack-frame having upper and lower racks in different vertical planes, an auxiliary slidable frame yieldably connected therewith and connected with the shiftable gears for shifting the same, a transverse shaft extending through said rack-frame and driven from the engine, a gear-wheel slidable on said shaft and keyed thereto and adapted to be placed in mesh with said racks respectively for sliding said frames to set the transmission gears, means for shifting said gear wheel to engage said respective racks, an engine-clutch, means for relieving said clutch automatically from said frames when the transmission gears are to be shifted from one position to another, a brake-drum having a brake-band thereon, and means for tightening said band on said drum on the movement of said slidable rack-frame so as to check excessive speed action of the engine-clutch when the transmission gears are being shifted from first to second speed positions.

Signed at New York city, in the county of New York and State of New York, this 6th day of February, A. D. 1918.

LOUIS BIAVA.

Witnesses:
ARTHUR MARION,
CHAS. C. GILL.